United States Patent
Seshadri et al.

(10) Patent No.: US 10,333,853 B1
(45) Date of Patent: Jun. 25, 2019

(54) UNIFIED QUALITY OF SERVICE (QOS) FOR LABEL SWITCHING TRAFFIC

(71) Applicant: Amazon Technologies, Inc., Seattle, WA (US)

(72) Inventors: Kiran Kalkunte Seshadri, Cedar Park, TX (US); Bijendra Singh, Cedar Park, TX (US); Thomas A. Volpe, Austin, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 15/085,896

(22) Filed: Mar. 30, 2016

(51) Int. Cl.
| | |
|---|---|
| H04L 12/851 | (2013.01) |
| H04L 12/723 | (2013.01) |
| H04L 5/00 | (2006.01) |
| H04L 12/741 | (2013.01) |
| H04L 29/06 | (2006.01) |
| H04L 12/801 | (2013.01) |
| H04L 12/733 | (2013.01) |

(52) U.S. Cl.
CPC ............ *H04L 47/24* (2013.01); *H04L 5/0064* (2013.01); *H04L 45/20* (2013.01); *H04L 45/50* (2013.01); *H04L 45/745* (2013.01); *H04L 47/11* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2006/0182127 A1 | 8/2006 | Park | |
| 2010/0254262 A1 | 10/2010 | Kantawala et al. | |
| 2011/0141891 A1 | 6/2011 | So | |
| 2012/0134260 A1* | 5/2012 | Chou | H04L 43/065 370/225 |
| 2013/0022041 A1* | 1/2013 | Kini | H04L 12/66 370/389 |
| 2016/0330114 A1* | 11/2016 | Gafni | H04L 45/50 |

OTHER PUBLICATIONS

U.S. Appl. No. 15/085,917, filed Mar. 30, 2016, Titled: Congestion Control for Label Switching Traffic.
Davie et al., "Explicit Congestion Marking in MPLS," Network Working Group Requests for Comments: 5129 (Jan. 2008), 22 pages.
Le Faucheur, et al., "Multi-Protocol Label Switching (MPLS)," Network Working Group Requests for Comments: 3270 (May 2002), 65 pages.

(Continued)

*Primary Examiner* — Adnan Baig
(74) *Attorney, Agent, or Firm* — Kilpatrick Townsend & Stockton LLP

(57) ABSTRACT

A system can provide a unified quality-of-service for multi-path label switching (MPLS) traffic. A single network device can be configured as an ingress label switch router, an egress label switch router or a label switching router for different label switching paths. The network device can support uniform deployment model, pipe deployment model or short-pipe deployment model in any configuration. A configurable scheduler priority map can be selected from multiple scheduler priority maps to generate a scheduler priority class which can be used to assign priority and resources for the packet.

24 Claims, 17 Drawing Sheets

(56) References Cited

OTHER PUBLICATIONS

Rosen, et al., "Multiprotocol Label Switching Architecture," Network Working Group Requests for Comments: 3031 (Jan. 2001), 61 pages.
Steenbergen, Richard A.. [online]. nLayer Communications, Jun. 2010 [retrieved on Apr. 5, 2016]. Retrieved from the Internet: <URL: http://www.nanog.org/meetings/nanog49/presentations/Sunday/mpls-nanog49.pdf>, 64 pages.

* cited by examiner

| CONFIGURATION FIELD 902 | DESCRIPTION 904 |
|---|---|
| CONGESTION MARKED (CM) CODE POINT 906 | CM CODE POINT VALUE FOR THE LABEL SWITCHING PATH (LSP) |
| MPLS TRAFFIC CLASS (TC) UPDATE POLICY FOR MPLS PUSH (NOT-BOS) 908 | 0-COPY THE MPLS TC OF THE MPLS INNER HEADER TO THE MPLS OUTER HEADER<br>1- SET A FRESH VALUE PRESENT IN THE "MPLS TC FOR PUSH" FIELD |
| MPLS TC UPDATE POLICY FOR MPLS PUSH (BOS) 910 | 0-USE THE MPLS TC VALUE FROM THE IP DSCP TO TC MAP<br>1- SET A FRESH VALUE PRESENT IN THE "MPLS TC FOR PUSH" FIELD |
| MPLS INNER TC UPDATE POLICY FOR MPLS POP WITH EXPLICIT NULL (PHP NOT-BOS) 912 | 00-COPY INGRESS OUTER TC TO INNER TC ONLY IF INNER TC IS NOT CM. MARK INNER TC AS CM IF EXPERIENCING CONGESTION<br>01- COPY INGRESS OUTER TC TO INNER TC ONLY IF INNER TC IS NOT CM. MARK OUTER TC AS CM IF EXPERIENCING CONGESTION<br>10-RESERVED, 11-NO CHANGE |
| MPLS INNER TC UPDATE POLICY FOR MPLS POP (NOT-BOS) WITHOUT EXPLICIT NULL 914 | 0-COPY INGRESS OUTER TC TO INNER TC ONLY IF INNER TC IS NOT CM. MARK INNER TC AS CM IS EXPERIENCING CONGESTION<br>1- NO CHANGE |
| IP ECN UPDATE POLICY FOR MPLS POP OF THE LAST MPLS LABEL STACK (PHP BOS) WITH EXPLICIT NULL 916 | 0-MAP INGRESS MPLS TC TO INNER IP ECN ONLY IF IP ECN IS ECT(0)/ECT(1) & MPLS TC IS EQUAL TO CM. MARK IP ECN AS CE IF EXPERIENCING CONGESTION<br>1- NO CHANGE |
| IP ECN UPDATE POLICY FOR MPLS POP OF THE LAST MPLS LABEL STACK (BOS) WITHOUT EXPLICIT NULL 918 | 0-MAP INGRESS MPLS TC TO INNER IP ECN ONLY IF IP ECN IS ECT(0)/ECT(1) & MPLS TC IS EQUAL TO CM. MARK IP ECN AS CE IF EXPERIENCING CONGESTION<br>1- NO CHANGE |
| MPLS TC FOR PUSH 920 | A FRESH MPLS TC VALUE FOR MPLS PUSH |

FIG. 9

UNIFIED QUALITY OF SERVICE (QOS) FOR LABEL SWITCHING TRAFFIC

BACKGROUND

Modern data networks carry different types of services, e.g., voice, video, streaming music, web pages, email, etc. Different types of mechanisms exist to provide quality of service (QoS) for traffic management of packets carrying data for different services. In the field of computer networking, quality of service is an ability to provide different priorities to different applications, users, or data flows. In some instances, requirements of some applications or users can be more critical than others, thus requiring preferential treatment for certain traffic. Differentiated services specify a mechanism for classifying and managing network traffic and providing quality of service on modern data networks. For example, differentiated services can be used to provide low-latency to critical network traffic such as voice or streaming media while providing simple best-effort service to non-critical services such as web traffic or file transfers.

Multiprotocol label switching (MPLS) protocol is used to provide QoS by defining label switched paths (LSPs) that can support specific service level agreements (SLAs) between service providers and customers. Generally, MPLS protocol uses short labels, instead of network addresses, to direct packets from one network node to another network node through an MPLS tunnel. Various deployment models, e.g., uniform model, pipe model or short-pipe model, can allow implementation of differentiated services through the MPLS tunnel. Generally, a network switch can only support one of the deployment models in order to implement the desired QoS in a network. Once a switch that supports a particular deployment model is deployed in the field, any changes in the QoS for the customer's next business model may not be supported by the switch without changing the switch or the hardware. Thus, the customers may be limited to using specific type of switches for specific deployment models.

BRIEF DESCRIPTION OF THE DRAWINGS

Various embodiments in accordance with the present disclosure will be described with reference to the drawings, in which:

FIG. 9 illustrates an MPLS QoS configuration table, in one embodiment of the disclosed technologies.

DETAILED DESCRIPTION

Figure 1:
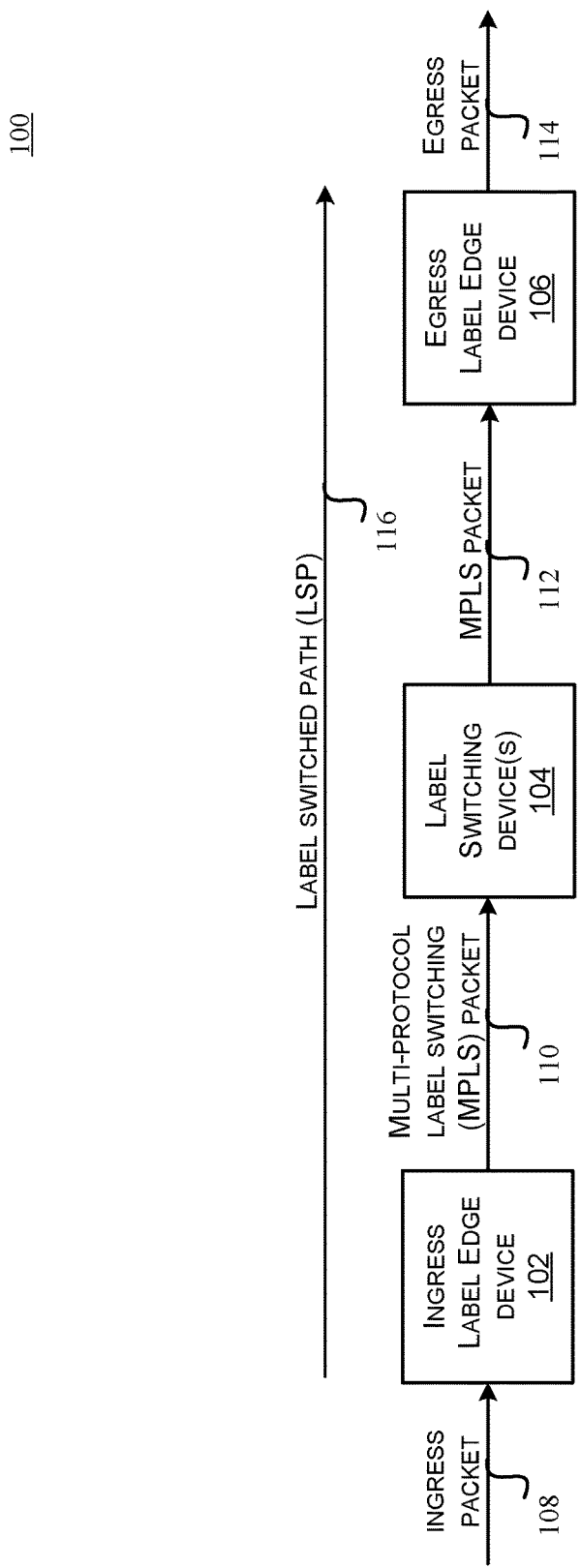
FIG. 1 illustrates components of a Multiprotocol label switching (MPLS) network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Label switching (LS) provides a mechanism to direct packets from one network node to another network node using labels. In label switching, each packet is assigned a label number and the switching takes place after examination of the label assigned to each packet. In a label switching path (LSP), a different label can be used for each hop, and can be chosen by a router or a switch performing the forwarding operation. Multiprotocol Label Switching (MPLS) is a specific implementation of label switching. MPLS is a type of data-carrying service for high-performance telecommunications networks that directs packet from one network node to the next node based on short path labels rather than long network addresses, thus avoiding complex lookups in a routing table. The labels can identify virtual links between nodes rather than endpoints. MPLS protocol is generally known as a layer 2.5 protocol since it typically operates in a layer that lies between the OSI (Open Systems Interconnection) Layer 2 (data link layer) and OSI Layer 3 (network layer). The MPLS protocol can be used to provide quality of service by defining label switched paths (LSPs) that can, for example, support specific service level agreements (SLAs). An SLA forms a contract between a customer and a service provider and specifies the features and performance requirements of the services provided to the customer.

LSPs can be created using any network protocol, e.g., Internet Protocol (IP), Asynchronous Transport Mode (ATM), frame relay, etc. An ingress label edge router (LER)

can encapsulate a Layer 3 (L3) packet with an MPLS label for routing across an LSP also called an MPLS tunnel. MPLS encapsulation can be achieved by inserting an MPLS header between a Layer2 (L2) header and an L3 header of the L3 packet. For example, the L3 packet may be an Internet Protocol (IP) packet comprising an IP header. The IP header may include differential services (DS) or type of service (TOS) fields that can be used to specify a priority for processing and routing of the IP packet in a network. The DS or TOS fields may include differential services code point (DSCP) or explicit congestion notification (ECN) to implement QoS in the IP networks.

The MPLS header may include an MPLS label, an MPLS traffic class (TC), a bottom of stack (BOS) indicator and a time-to-live (TTL) indicator. The BOS indicator indicates the end of the MPLS stack and the beginning of the L3 header. The MPLS TC can be used to provide differential services and explicit congestion notification. An MPLS stack can include multiple MPLS headers. An egress LER can remove the MPLS label and can forward the decapsulated packet to its final destination. A label switching router (LSR) can provide switching in the middle of the LSP.

In some implementations, differentiated services can categorize the traffic into various service classes in order to provide quality of service within a network domain. A quality of service (QoS) attribute from a packet can include a meta-data associated with the QoS that can be used to prioritize the packet. For example, the QoS attribute may include QoS parameters or values from different fields of an MPLS header (e.g., MPLS traffic class) or an IP header (e.g., DSCP field or ECN field) of the packet.

When a labeled packet is received by an MPLS router, the topmost label is examined. Based on the contents of the label, an MPLS swap, an MPLS push or an MPLS pop operation can be performed on the packet's label stack. In an MPLS swap operation, a BOS value of zero may indicate to an LSR that the label stack implementation is in use and the label can be swapped with a new label. The LSR can forward the packet along the LSP associated with the new MPLS label. An MPLS push (BOS) operation can indicate that an MPLS packet is pushed at the bottom of stack or where the L3 header begins. For example, an MPLS label can be pushed on top of an L3 packet to effectively encapsulate the L3 packet in an MPLS tunnel. In an MPLS push (Not-BOS) operation, a new MPLS label can be pushed on top of an existing MPLS label, effectively "encapsulating" the MPLS packet in another layer of MPLS. This can allow hierarchical routing of MPLS packets. In an MPLS pop operation, a "decapsulation" process can be performed to remove the label from the packet, which may reveal an inner label below. In some implementations, a BOS value of one in the inner label may indicate that the label that has been encountered is the bottom label of the label stack. In an MPLS pop (BOS) operation, the popped label is the last label on the label stack, and therefore the packet can leave the MPLS tunnel. In an MPLS pop (Not-BOS) operation, the popped label may not be the last label on the label stack, and therefore an egress LER can continue to pop all the labels until the value of BOS becomes 1, which can indicate an end of stack and the packet can be forwarded as an L3 packet.

Quality of service implementation may vary between an MPLS domain and an L3 domain. The MPLS and the L3 packet interoperate when crossing from one domain to another. Different deployment models for differential services tunneling can be implemented to provide integration or separation of different domains. In some instances, a pipe or a short-pipe deployment model can be implemented to maintain separation of domains. For example, in the pipe deployment model, QoS scheduling at the egress interface can be based on the QoS attributes of the encapsulating MPLS header. In the short-pipe deployment model, the forwarding treatment at the egress LER may be based on the tunneled packet, as opposed to the encapsulating packet. For example, the QoS scheduling can be based on the encapsulated L3 header (tunneled differential service information). A uniform deployment model can provide the same QoS attributes for the encapsulating and the encapsulated header. The uniform model can make all the nodes that an LSP traverses visible to nodes outside the tunnel.

Generally a single switch can only support one type of deployment model to implement certain quality of service. For example, the switch hardware may only support either the universal deployment model or the pipe deployment model for mapping between certain domains. Once a switch which supports a particular deployment model is deployed in the field to implement a certain quality of service, the switch can become redundant if a next business model for the customer requires a different deployment model to implement a different quality of service. Therefore, in most instances, change in the deployment model to support different quality of services cannot be supported without changing the switch or the switch hardware thus resulting in unnecessary costs. In addition, the current systems do not provide a configurable mechanism to dynamically map resources and priority associated with different packets, tunnels and traffic connections. It is also desirable to have a robust mechanism to signal congestion in a network using the MPLS traffic class.

Various embodiments of the disclosed technologies can allow a single network device to support various deployment models (e.g., uniform, pipe or short-pipe) associated with different LSPs simultaneously. The network device can be implemented as a switch, a router or as any suitable network device. The network device can be configured as an ingress label edge router (LER) for a first LSP, an egress LER for a second LSP or a label switching router (LSR) for a third LSP. Some embodiments can provide provisioning of differential services in the network device using the Multiprotocol Label Switching (MPLS) traffic class (TC). An MPLS label switched path (LSP) can start at the ingress LER and terminate at the egress LER. At the edge routers, QoS markings of the encapsulated or decapsulated packets can be transferred in multiple configurable ways to provide flexibility for the customers to implement different deployment models (pipe, short-pipe or uniform). Some embodiments of the disclosed technologies can provide a configurable method to determine a scheduler priority class for the packet. The scheduler priority class may be mapped from the IP DSCP or the MPLS TC using a configurable scheduler priority map. The scheduler priority map may be selected from a plurality of configurable maps using one or more fields from the packet, e.g., the MPLS label or the IP address. Note that the embodiments of the disclosed technologies have been described using the MPLS protocol, however, it will be understood that the embodiments can be used with any label switching protocol without deviating from the scope of the technology.

In one embodiment, when the MPLS LSP is started (e.g., the switch is configured as an ingress LER), the MPLS traffic class can be mapped to a scheduler priority class to classify the packet and to determine the service level. The MPLS traffic class can be mapped from the IP DSCP using a traffic class map. The traffic class map may be selected from a plurality of configurable traffic class maps using one or more fields from the IP packet, e.g., the IP address. When LSPs are terminated (e.g., the switch is configured as an egress LER), the QoS markings can be performed based on the deployment model. In the pipe deployment model, the MPLS TC of the outermost MPLS header (the header being removed) can be mapped to the scheduler priority class. In the short-pipe deployment model, the MPLS TC or the IP DSCP of the decapsulated header can be mapped to the scheduler priority class. When the switch is configured as an LSR, the MPLS TC of the outermost MPLS header can be used to obtain the scheduler priority class.

In some embodiments of the disclosed technologies, an MPLS traffic class update policy and other configuration settings can be used to control the QoS marking of an egress packet. For example, the MPLS TC update policies and the configuration settings can be programmed in an MPLS QoS configuration table and/or port specific QoS configuration registers. The MPLS TC update policies and the configuration settings may be based on the deployment model configuration. In some embodiments, the port specific QoS configuration registers may be used in place of or in addition to the configuration provided by the MPLS QoS configuration table to update the QoS attributes of the egress packet.

Some embodiments can provide explicit congestion notification in the router using a congestion field and a quality of service (QoS) field of a label switching (LS) packet. For example, the LS packet can include an L3 header comprising a congestion field, and an LS header comprising a quality of service (QoS) field. In some embodiments, the LS packet can be an MPLS packet comprising an IP header and an MPLS header. For example, the congestion field can be an explicit congestion notification (ECN) field from the IP header and the QoS field can be the MPLS traffic class from the MPLS header. In some embodiments, the MPLS traffic class can be used to denote if a packet has experienced congestion in the network. In some embodiments, a determination that the packet has experienced congestion in the network can be made based on the ECN field from an ingress IP packet or a congestion notification associated with the router (e.g., from an active queue manager in the router). The MPLS traffic class can represent a plurality of code points. According to some embodiments, one MPLS traffic class code point can be configured as congestion marked (CM) code point and the remaining MPLS traffic class code points can be configured as not congestion marked (Not CM) code points. For example, the MPLS traffic class can be a three bit field which can represent eight different MPLC traffic class code points. In some embodiments, one out of the eight MPLC traffic class code points can be configured to indicate a congestion marked (CM) code point associated with traffic congestion and the remaining seven code points can be configured to indicate Not-CM (not-congestion marked) code points. Thus, the embodiments can allow flexibility and maximum utilization of the MPLS traffic class code points. Some embodiments can also provide flexibility for the LSP to change PSC (Per-hop behavior Service Class) domains by allowing for the MPLS traffic class and IP DSCP value to be remapped to a different behavior aggregate (BA). Thus, embodiments of the technologies can provide a unified quality of service for implementing various service level agreements (SLAs) using a flexible configuration approach.

FIG. 1 illustrates components of an MPLS network 100. In some implementations, the MPLS network 100 may include an ingress label edge device 102, one or more label switching devices 104 and an egress label edge device 106. Each of the ingress label edge device 102, label switching device(s) 104 and the egress label edge device 106 may be implemented as a switch, a router or any suitable network device.

A label switched path (LSP) 116 is a path through the MPLS network 100. The LSP 116 may be established to route traffic along a specified path through a network or to create virtual private networks (VPNs). The LSP 116 may implement one or more MPLS tunnels for routing MPLS packets through the MPLS network 100. The LSP 116 can be created using any network protocol, e.g., Internet Protocol (IP), Asynchronous Transport Mode (ATM), frame relay, etc.

The ingress label edge device 102 may be configured to receive an ingress packet 108. The ingress packet 108 may include a Layer 3 (L3) packet, an asynchronous transfer mode (ATM) frame, an Ethernet frame, etc. For example, the L3 packet may include an Internet Protocol (IP) packet that may be based on an IP protocol, e.g., the Internet Protocol version 4 (IPv4) or the Internet Protocol version 6 (IPv6). The ingress label edge device 102 may be implemented as an ingress label edge router that can operate as an entry point of the MPLS network 100. The ingress label edge device 102 may be configured to push an MPLS header comprising an MPLS label onto the ingress packet 108. The ingress label edge device 102 may determine the MPLS label based on an appropriate forwarding equivalence class (FEC). In some implementations, the MPLS headers may be added between the network layer (L3) header and the link layer (L2) header of the OSI model. The ingress label edge device 102 may then forward a labeled or encapsulated MPLS packet 110 through the MPLS tunnel. In some implementations, the ingress label edge device 102 may be called a provider edge (PE) router.

The label switching device 104 may be configured to receive the MPLS packet 110 and swap the outer label of the MPLS packet 110 with another label. The label switching device 104 may use the MPLS label included in the header of the MPLS packet 110 as an index to determine the next hop on the LSP 116 and a corresponding label for the MPLS packet 110 from a lookup table. In some instances, the label switching device 104 may remove the old label from the header and replace with a new label before forwarding an MPLS packet 112 with the new label to the next router. The next router may be another label switching device 104 or the egress label edge device 106. In some implementations, the label switching device 104 may be a next-to-last router that can be configured as a penultimate hop popping (PHP) router. The PHP router may receive an implicit NULL label from the egress label edge device 106 and may remove the outer label from the MPLS packet 110 before passing the packet to the egress label edge device 106. The PHP may be used to reduce the load on the egress label edge device 106. In some implementations, the label switching device 104 may also be called a transit router or a provider (P) router.

The egress label edge device 106 may be implemented as an egress label edge router that can operate as an exit point of the MPLS network 100. The egress label edge device 106 may be configured to remove or pop the MPLS header from the MPLS packet 112 before providing an egress packet 114. For example, the egress label edge device 106 may remove the MPLS label from an IP packet and then forward a decapsulated IP packet using normal IP forwarding rules.

Figure 2:
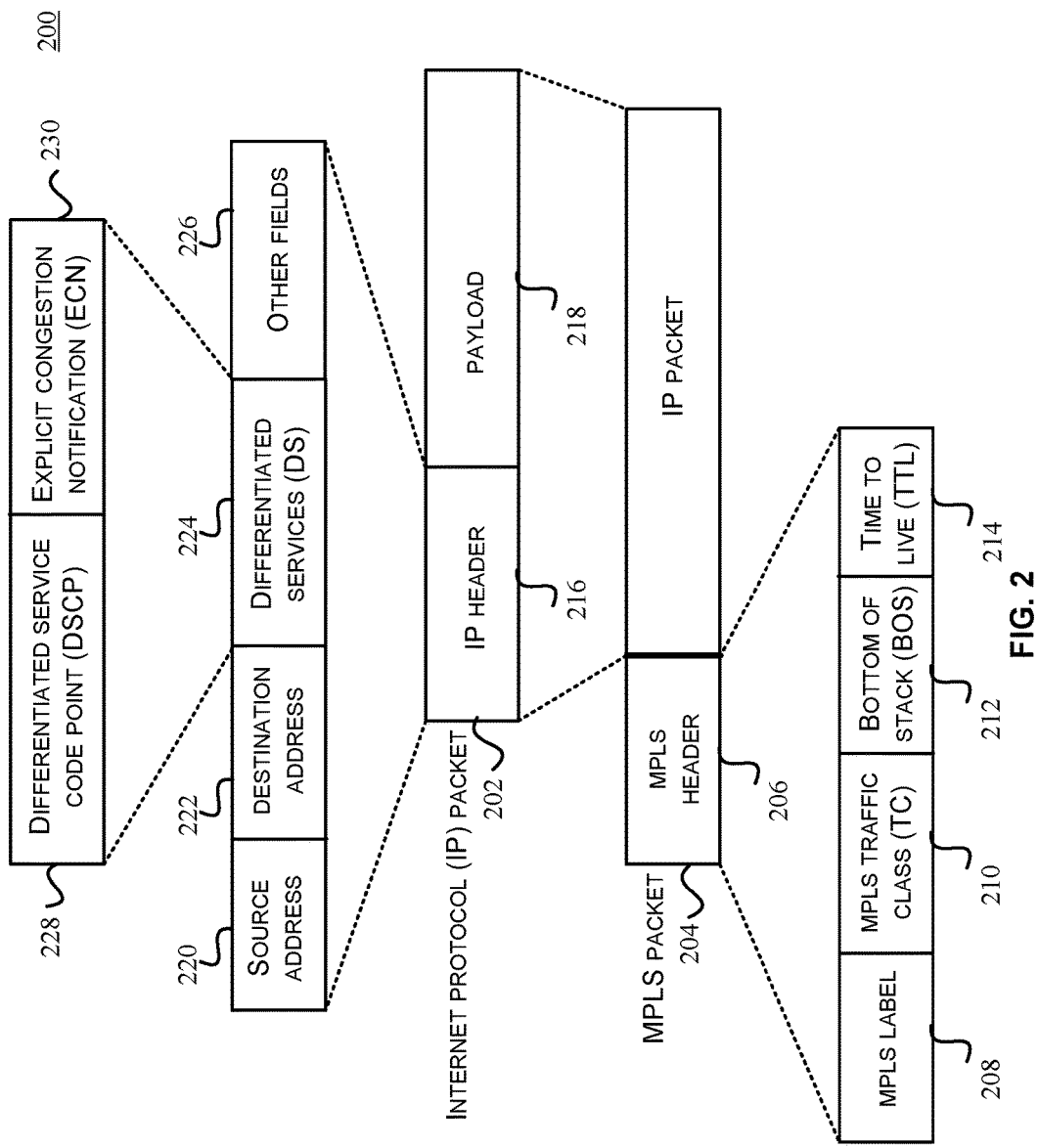
FIG. 2 illustrates an MPLS packet with an encapsulated IP packet.

FIG. 2 illustrates an MPLS packet with an encapsulated IP packet.

An IP packet 202 may include an IP header 216 and a payload 218. The IP header 216 may include control information associated with the delivery of the payload 218. For example, the IP header 216 may include a source address 220, a destination address 222, differentiated services (DS) 224 and other fields 226. For example, the other fields 226 may include an IP time-to-live (TTL), error correction codes, a version number (e.g., IPv4, IPv6, etc.), a packet length and any other relevant information.

The DS 224 may be configured to provide the QoS attributes in the IP header 216 for packet classification. For example, in some instances, the traffic may be classified by many different parameters, such as source address, destination address or traffic type and assigned to a specific traffic class. The DS 224 is generally an eight bit field that can be used to specify the per-hop behavior (PHB) of the IP packet 202. In some implementations, the differentiated services 224 may also be called a type of service (TOS). The differentiated services 224 may be used to specify a priority for processing and routing of the IP packet 202 in a network. The differentiated services 224 may include a differentiated service code point (DSCP) 228 and an explicit congestion notification (ECN) 230. The DSCP 228 is generally a six bit field that can be used to specify up to 64 ($2^6$) different traffic classes. For example, some commonly used per-hop behaviors include default PHB for best-effort traffic, expedited forwarding (EF) PHB for low-loss, low-latency traffic, and assured forwarding (AF) PHB that can give assurance of delivery under prescribed conditions.

The ECN 230 is generally a two bit field that can be used to indicate congestion in a network. Generally, networks signal congestion by dropping packets. In such cases, an acknowledgement may not be returned by the destination router. The source router may keep retransmitting the packet until the acknowledgement is received from the destination router or a time-out is occurred. The ECN 230 allows attaching a special mark to the IP header instead of dropping a packet in order to signal impending congestion. The receiver of the packet can echo the congestion indication to the sender, which can slow down its transmission rate so that the packets don't get dropped. The ECN 230 can represent four different pre-determined code points using the two bits to allow end-to-end notification of network congestion without dropping packets. For example, a value of "00" indicates non-ECT (ECN-Capable Transport) code point, a value of "10" indicates ECT(0) code point, a value of "01" indicates ECT(1) code point, and a value of "11" indicates CE (congestion encountered) code point. The ECT(0) and ECT (1) code points indicate that both end points in a network can support ECN. If a router can support ECN and is experiencing congestion the router can change the code point to CE instead of dropping the packet. The transmitting end router can control its transmission rate after receiving the pre-determined CE code point.

An MPLS packet 204 may include an MPLS header 206 attached to the IP packet 202. For example, the IP packet 202 may be similar to the ingress packet 108 as described with reference to FIG. 1, and the MPLS header 206 may be attached to the IP packet 202 by the ingress label edge device 102 for routing through the LSP 116. The MPLS packet 204 may be similar to the MPLS packet 110. The MPLS header 206 may include an MPLS label 208, an MPLS traffic class (TC) 210, a bottom-of-stack (BOS) 212 and a time-to-live (TTL) 214. In some instances, the MPLS header 206 may include a MPLS label stack comprising a plurality of labels. Each of the plurality of labels in the stack may include a respective MPLS label, TC, BOS and a TTL.

The MPLS label 208 may include a twenty bit label value. The MPLS label 208 may be used by the receiving MPLS router for routing the MPLS packet 204 to the next hop in the LSP 116. The MPLS TC 210 is generally a three bit field that can be used to specify quality of service priority and ECN. The BOS 212 is a one bit field that can indicate whether the current label is the last label in the stack. For example, a value of "1" for the BOS 212 may indicate an end-of-stack and a value of "0" may indicate a not end-of-stack. The TTL 214 is an eight bit field that can be used to prevent forwarding loops sending packets indefinitely in a loop. In some instances, MPLS circuits can stack multiple labels to form tunnels within tunnels. This is explained with reference to FIG. 3.

Figure 3:
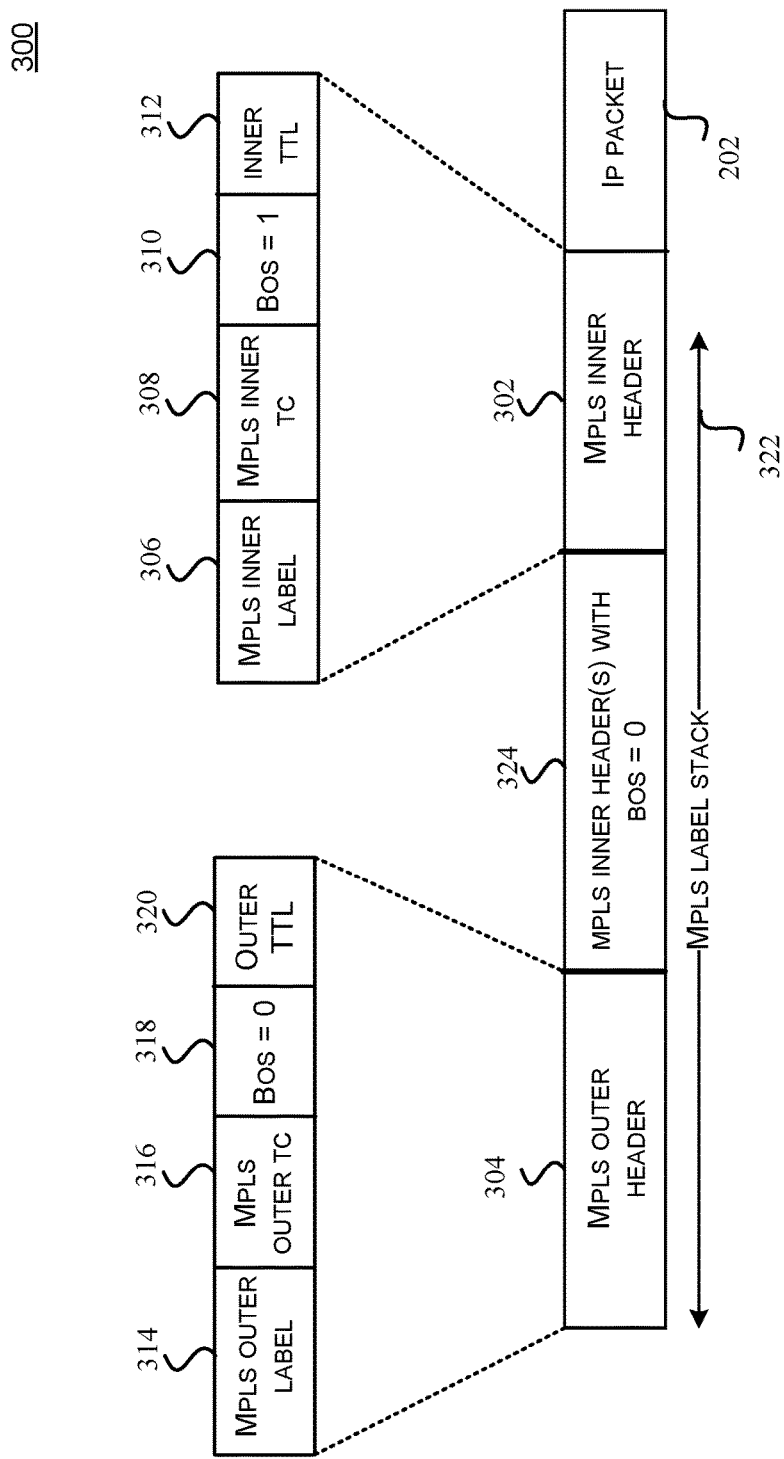
FIG. 3 illustrates an MPLS packet comprising a label stack.

FIG. 3 illustrates an MPLS packet comprising a label stack. In some instances, an MPLS label switching router can impose multiple labels. The BOS indicator can identify if the label that has been encountered is the bottom label of the label stack.

An MPLS packet 300 may include an MPLS label stack 322 comprising a plurality of labels. As illustrated in the figure, the MPLS packet 300 may include an MPLS inner header 302 and an MPLS outer header 304 imposed on the IP packet 202. The MPLS inner header 302 may include an MPLS inner label 306, an MPLS inner TC 308, a BOS 310 set to "1", and an inner TTL 312. The MPLS outer header 304 may include an MPLS outer label 314, an MPLS outer TC 316, a BOS 318 set to "0", and an outer TTL 320. The MPLS label stack 322 may also include zero or more MPLS inner headers 324 between the MPLS inner header 302 and the MPLS outer header 304. The MPLS inner headers 324 may include respective BOS set to "0" indicating a label stack implementation. Label stacks are generally implemented by the ingress label edge device 102. In some implementations, the BOS 318 value of "0" can indicate that the label stack implementation is in use and the label switching device(s) 104 will only swap the top most label in the stack, e.g., the MPLS outer label 314. The egress label edge device 106 will continue to pop all the labels until the value of BOS becomes "1" (e.g., the BOS 310), which indicates that there are no more labels and the packet can be forwarded as an IP packet.

Figure 4:
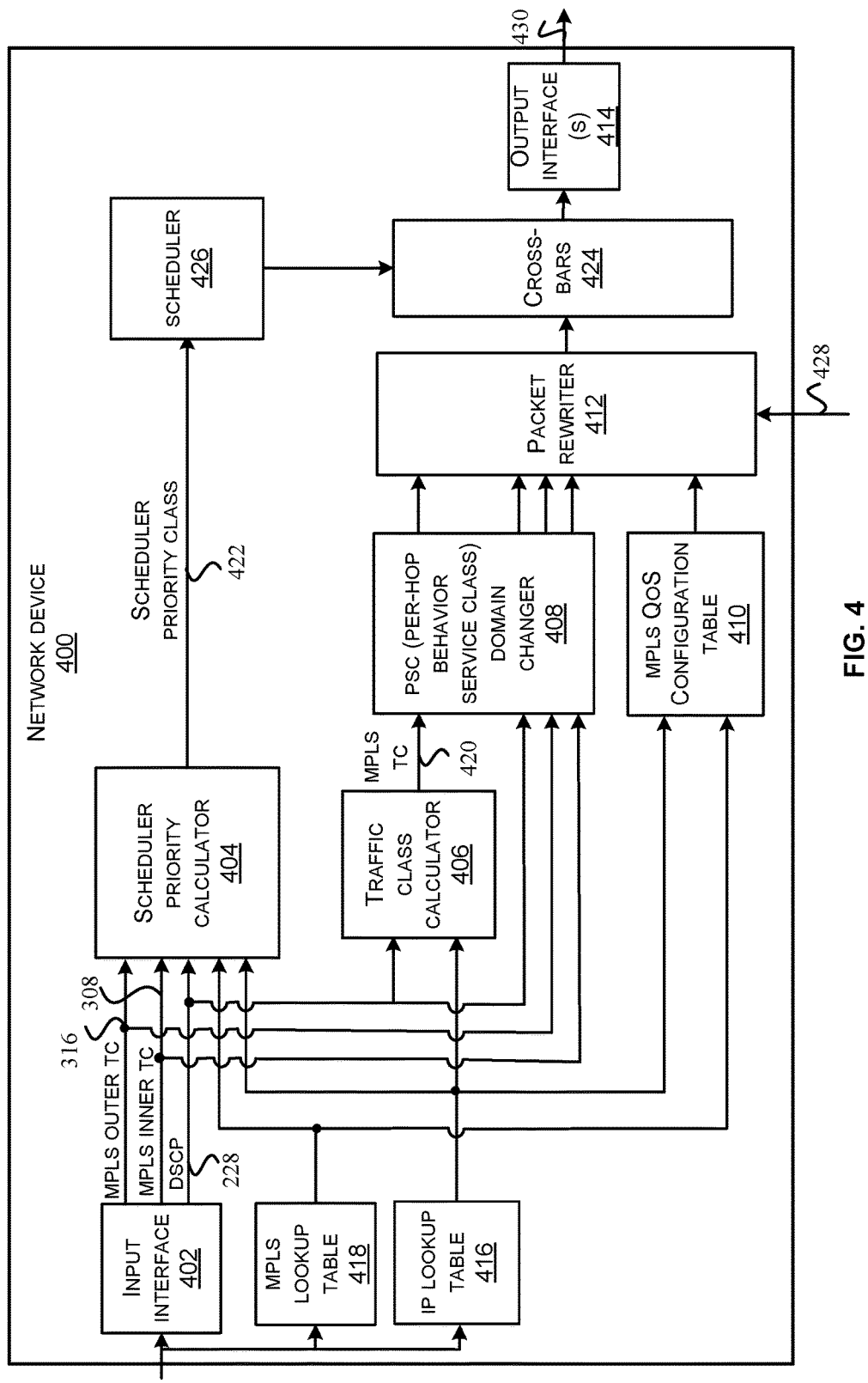
FIG. 4 illustrates a block diagram of a network device, in one embodiment of the disclosed technologies.

FIG. 4 illustrates a block diagram of a network device 400 in one embodiment of the disclosed technologies. According to some embodiments, the network device 400 can be configured as an ingress label edge router, a label switching router or an egress label edge router for different LSPs using different deployment configurations. For example, the network device 400 can be configured as the ingress label edge device 102, the label switching device 104 or the egress label edge device 106, as discussed with reference to FIG. 1. Further, embodiments of the technology can allow using an MPLS label or an IP address from a respective packet to select a scheduler priority map for determining a scheduler priority class. The scheduler priority class can then be used to determine a priority and resources for forwarding that packet to the next hop. Note that some embodiments of the disclosed technologies have been discussed using an IP packet as an ingress packet to the MPLS tunnel. However, it will be understood that the embodiments can be used with other protocols, e.g., Ethernet, ATM, etc.

The network device 400 can include an input interface 402, a scheduler priority calculator 404, a traffic class calculator 406, a per-hop behavior service class (PSC) domain changer 408, an MPLS QoS configuration table 410, a packet rewriter 412, an output interface 414, an IP lookup table 416, an MPLS lookup table 418, a scheduler 426 and cross-bars 424. Note that the network device 400 may include more or less components than shown in FIG. 4 without deviating from the scope of the disclosed technologies. For example, the network device 400 may include a processor, memory, queues, buffers and any other components suitable for implementing the functionality of a switch or a router. The processor may be configured to execute a plurality of instructions. The instructions may be stored on a non-transitory computer-readable storage medium, for example, in the form of a computer program. In some implementations, the network device 400 may include an active queue manager (not shown) which may be configured to manage a plurality of queues (e.g., virtual output queues) and to provide a congestion notification based on the status of the queues, e.g., in case of a backup. The network device 400 or different components of the network device 400 can be implemented as an integrated circuit, a system-on-chip (SOC), a field programmable gate array (FPGA) or any suitable circuit.

The input interface 402 may comprise circuitry to receive a packet. In some embodiments, the packet may be received via a network port and can be stored in a memory (e.g., not shown) before the packet can be forwarded, encapsulated or decapsulated for further processing. For example, the memory may be implemented as a buffer or a queue using any suitable logic. The packet may be associated with a label switching path, e.g., similar to the LSP 116. The packet may be an IP packet or an MPLS packet comprising respective QoS attributes. In one instance, the network device 400 may be configured as an ingress label edge device for a first label switching path. For example, the packet may be the IP packet 202 and the QoS attribute may include the DSCP 228 and the ECN 230, as discussed with reference to FIG. 2. In another instance, the network device 400 may be configured as an egress label edge device for a second label switching path. For example, the packet may be the MPLS packet 300 and the QoS attributes may include the MPLS inner TC 308 and the MPLS outer TC 316. In another instance, the network device 400 may be configured as a label switching device for a third label switching path. For example, the packet may be the MPLS packet 204 and the QoS attributes may include the MPLS TC 210. The input interface 402 may provide the appropriate QoS attribute from the packet to the scheduler priority calculator 404 for calculating a scheduler priority class. In some embodiments, the input interface 402 may receive an ingress packet 428 or parts of the ingress packet 428, e.g., one or more fields of the packet header from the ingress packet 428.

The scheduler priority calculator 404 may be configured to determine a scheduler priority class 422 for a packet using a QoS attribute from the packet and a scheduler priority map. In some embodiments, based on the router configuration (e.g., ingress LER, LSR or egress LER), determination of the scheduler priority class 422 may depend upon the deployment model configuration. For example, in one embodiment, the scheduler priority calculator 402 may determine the scheduler priority class 422 based on the DSCP 228 of the IP packet 202 being encapsulated (e.g., MPLS push BOS) for the universal deployment model or the pipe deployment model, when the network device 400 is configured as the ingress label edge device. In one embodiment, the scheduler priority calculator 402 may determine the scheduler priority class 422 based on the DSCP 228 of the IP packet 202 being decapsulated (e.g., MPLS pop BOS) for the short-pipe deployment model, when the network device 400 is configured as an egress label edge device. In one embodiment, the scheduler priority calculator 402 may determine the scheduler priority class 422 based on the MPLS outer TC 316, when the network device 400 is configured as a label switching router. In another embodiment, the scheduler priority calculator 402 may determine the scheduler priority class 422 based on the MPLS outer TC 316 for the universal deployment model or the pipe deployment model, and based on the MPLS inner TC 308 for the short-pipe deployment model, when the network device 400 is configured as an egress label edge router. The scheduler priority map may be selected from a plurality of configurable maps using one or more fields from the packet, e.g., an MPLS label from an MPLS header or an IP address from an IP header of the packet. The scheduler priority calculator 404 is further described in detail with reference to FIGS. 5-7.

The traffic class calculator 406 may be configured to generate an MPLS traffic class based on the IP DSCP using a traffic class map. For example, in one embodiment, when the network device 400 is configured as an ingress label edge device, an MPLS header may be added to the IP packet. As discussed with reference to FIG. 2, the L3 packet may be the IP packet 202. In some embodiments, the DSCP 228 of the IP packet 202 may be used to generate an MPLS TC 420. For example, six bits of the DSCP 228 can be mapped to three bits MPLS TC 420. The MPLS TC 420 can represent a plurality of code points. For example, the MPLS TC 420 can represent up to eight MPLC TC code points using the three bits. In some embodiments, one out of the eight MPLC TC code points can be configured to indicate a congestion marked (CM) code point and the remaining seven code points can be configured to indicate not-congestion marked (Not-CM) code points for a specific LSP. The traffic class map can be selected from a plurality of configurable traffic class maps using one or more fields of the IP packet 202. In some embodiments, the one or more fields can include fields from the IP header 216, e.g., IP address, etc. For example, the IP address may include the destination address 222 specified in the IP header 216. In some embodiments, if the PSC domains are changing, the traffic class map can be reconfigured for an IP DSCP that belongs to a different behavior aggregate. The traffic class calculator 406 is further described in detail with reference to FIG. 8.

The PSC domain changer 408 may be configured to update the QoS attribute for the packet from one behavior aggregate to another behavior aggregate due to the change in per-hop behavior scheduling class. For example, the MPLS TC 420 may be defined for voice traffic as "100" in a first PSC domain and as "010" in a second PSC domain. When the packet traverses from the first PSC domain to the second PSC domain, the MPLS TC 420 may need to be updated from "100" to "010". In some instances, if the router is experiencing congestion during PSC domain change, the MPLS TC can be marked to indicate CM code point or the IP ECN can be marked to indicate CE code point if the IP ECN is ECT(0) or ECT(1). The PSC domain changer 408 may update the QoS attribute based on various matching criteria, e.g., IP address match, destination media control access (DMAC) match, port match, etc.

In some embodiments, the PSC domain changer 408 may update the MPLS TC 420 MPLS outer TC 316, MPLS inner TC 308 or the DSCP 228 based on the router configuration. For example, when the network device 400 is configured as an ingress label edge device, when the PSC domains are changing, the traffic class map used for mapping the DSCP 228 to the MPLS TC 420 can be reconfigured to a set of MPLS TC code points that belong to a different behavior aggregate. Referring back to FIG. 8, in one implementation, the traffic class calculator 408 may select a different MPLS traffic class map for a second behavior aggregate than used for a first behavior aggregate. In some embodiments, the CM code point can be reconfigured as per the new behavior aggregate. For example, the CM code point for the MPLS TC can have a certain value (e.g., 0x3) in the first behavior aggregate and a different value (e.g., 0x7) in the second behavior aggregate.

In some embodiments, when the network device 400 is configured as an egress label edge device, the IP DSCP may change to a different behavior aggregate when PSC domains are changing. However, the IP ECN may not be changed due to change in the PSC domains.

In some embodiments, when the network device 400 is configured as a label switching device, the MPLS TC of the MPLS header being swapped can be changed to a different behavior aggregate. In some embodiments, the MPLS TC of the MPLS header being pushed to an MPLS stack can be changed to a different behavior aggregate. In some embodiments, when removing MPLS labels from an MPLS stack, the MPLS TC of the exposed MPLS header can be changed to a different behavior aggregate.

The MPLS QoS configuration table 410 may include a configuration table comprising various configuration fields for updating the QoS attributes based on an update policy. In some embodiments, the configuration fields may be configured based on different router configurations and the deployment models. The configuration values programmed in the MPLS QoS configuration table 410 may be used by the packet rewriter 412 for updating the QoS attributes. The MPLS QoS configuration table 410 is further described in detail with reference to FIG. 9.

The packet rewriter 412 may be configured to update one or more QoS attributes of the packet based on a router configuration, deployment model configuration or an MPLS QoS configuration before the packet is forwarded by the output interface 414. For example, in some embodiments, the packet rewriter 412 may update the MPLS outer TC 316, MPLS inner TC 308, DSCP 228 or the ECN 230 based on the deployment model configuration and the router configuration. In some implementations, the packet rewriter 412 may receive the ingress packet 428 from a physical port (e.g., a network port) of the network device 400. The packet rewriter 412 may perform encapsulation or decapsulation of the packet 428. For example, in some implementations, some of the functionality of the input interface 402 and the output interface 414 may be integrated with the packet rewriter 412. In some implementations, the encapsulation or decapsulation of the packet 428 may be performed in a different module. The packet rewriter 412 is further described in detail with reference to FIG. 10.

The scheduler 426 may be configured to assign priority and resources for processing the packet based on the scheduler priority class 422. For example, the scheduler 426 may use the scheduler priority class 422 to classify the packet for forwarding the packet to the next hop. In some embodiments, the scheduler 426 can schedule the cross-bars 424 based on the priority associated with the scheduler priority class 422. For example, based on the priority, certain traffic can get precedence over other traffic through the cross-bars 424. Thus, according to the embodiments, for a specific SLA, the MPLS traffic class for a packet can map to a certain scheduler priority class that can control the priority for forwarding the packet to the next hop.

The cross-bars 424 may be configured to route the egress packets to one of the output interfaces 414 based on the priority controls received from the scheduler 426. In some instances, the scheduler 426 may prioritize the traffic through the cross-bars 424 to route certain egress packets to a certain output interface. For example, based on the SLA, certain packets may have higher priority to get higher network bandwidth or faster network links than other packets and may be routed to a specific output interface based on the scheduler priority class 422. In some embodiments, the cross-bars 424 may receive traffic from other packet pipelines which may provide their corresponding scheduler priority classes. Thus, packets with different priorities can go through the cross-bars 424 and different weightage can be allocated for different priorities so that certain packets can get higher priority than others. For example, based on the priority class, certain packets can get 75% of the bandwidth and the other packets can get 25% of the bandwidth through the cross-bar 424. It will be noted that the embodiments have been described using the cross-bars 424, however, other suitable implementations for routing packets through the network device are possible, e.g., interconnect fabric, buses, matrix, mesh, etc.

The IP lookup table 416 may be configured to use one or more fields from an IP packet header to generate various controls signals, e.g., an MPLS TC map identifier, IP scheduler map ID, IP QoS config table index, MPLS action ID, etc. For example, the IP lookup table 416 may use the destination address 222 and any other fields from the IP header 216 to generate the control signals that may be used by different components of the network device 400. In one embodiment, the IP lookup table 416 may be configured to generate an MPLS TC map identifier (ID) that can be used by the traffic class calculator 406 to select a traffic class map from a plurality of configurable traffic class maps. In one embodiment, the IP lookup table 416 may be configured to generate an IP scheduler map ID that can be used by the scheduler priority calculator 404 to select an IP scheduler priority map from a plurality of configurable scheduler priority maps. In one embodiment, the IP lookup table 416 may be configured to generate an IP QoS config table index that can be used by the MPLS QoS configuration table 410 to access the appropriate configuration fields for updating the QoS attribute for the IP packet. In one embodiment, the IP lookup table 416 may be configured to generate an MPLS action ID that can be used to indicate an action performed on the packet. For example, the MPLS action ID may indicate an MPLS push (BOS) or MPLS push (Not-BOS), operation. The MPLS action ID may be used by the scheduler priority calculator 404 in selecting a scheduler priority class for different deployment model configurations. The IP lookup table 416 may be implemented in hardware or software or a combination thereof.

The MPLS lookup table 418 may be configured to use one or more fields from an MPLS packet to generate various controls signals, e.g., a deployment model identifier, MPLS scheduler map ID, MPLS QoS config table index, MPLS action ID, etc. For example, the MPLS lookup table 418 may use the MPLS label 208 and any other fields from the MPLS packet 204 to generate the control signals. In one embodiment, the MPLS lookup table 418 may be configured to generate a deployment model identifier (ID) that can indicate a uniform deployment model, a pipe deployment model or a short-pipe deployment model configuration associated with a particular LSP. For example, the deployment model configuration for a label switching path may determine the QoS attributes for an encapsulation header (e.g., an MPLS header) for the packet entering the path. The deployment model configuration may also dictate the QoS treatment for the packet at the time of decapsulation of the packet and/or exiting of the path. A scheduler priority class generated by the scheduler priority calculator 404 may also depend on the deployment model configuration for different router configurations. In one embodiment, the MPLS lookup table 418 may be configured to generate an MPLS scheduler map ID that can be used by the scheduler priority calculator 404 to select an MPLS scheduler priority map from a plurality of configurable scheduler priority maps. In one embodiment, the MPLS lookup table 418 may be configured to generate an MPLS QoS config table index that can be used by the MPLS QoS configuration table 410 to access the appropriate configuration fields for updating the QoS attribute for the MPLS packet. In one embodiment, the MPLS lookup table 418 may be configured to generate an MPLS action ID that can be used to indicate an action performed on the packet. For example, the MPLS action ID may indicate an MPLS pop BOS, MPLS pop (Not-BOS), or MPLS swap operation. The MPLS action ID may be used by the scheduler priority calculator 404 in selecting a scheduler priority class for different deployment model configurations. The MPLS lookup table 418 may be implemented in hardware or software or a combination thereof.

The output interfaces 414 may be configured to forward each of the packets based on the corresponding scheduler priority class for each packet. For example, the packet may be prioritized through the cross-bars 424 using the scheduler priority class 422 associated with the packet. An egress packet 430 may be forwarded via a physical network port of the network device 400. The output interface 414 may include a plurality of output interfaces which may include logical or physical interfaces. The packet 430 to be forwarded may include QoS attributes updated by the packet rewriter 412. In some embodiments, the output interface 414 may include port specific QoS configuration settings configured for the egress interface. In some implementations, the output interface 414 may perform encapsulation of the packets before forwarding the egress packet 430. In some embodiments, functionality of the output interface 414 may be integrated with the packet rewriter 412 or vice-versa.

Figure 5:
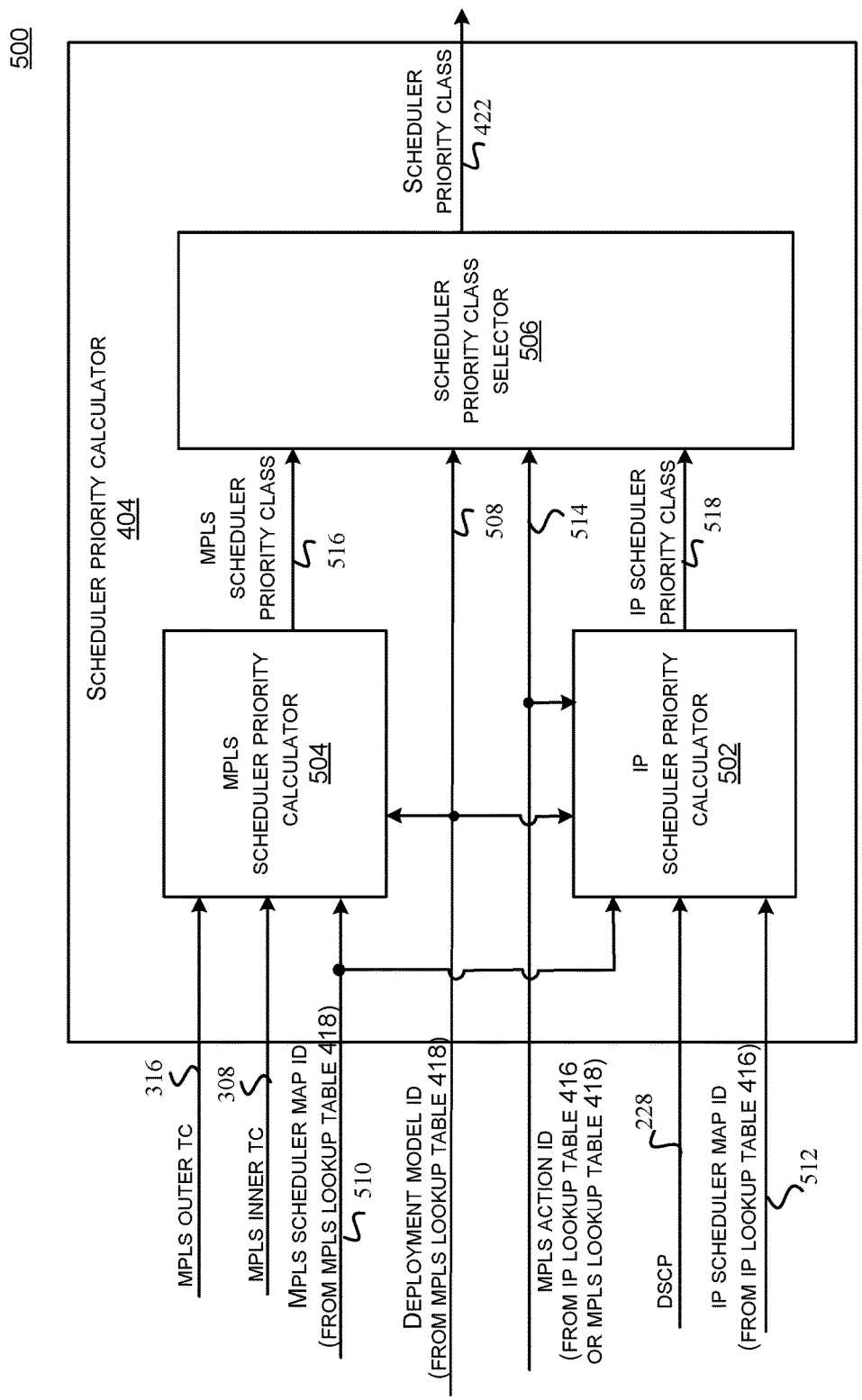
FIG. 5 illustrates a block diagram of a scheduler priority calculator, in one embodiment of the disclosed technologies.

FIG. 5 illustrates a block diagram of the scheduler priority calculator 404 in one embodiment of the disclosed technology. According to some embodiments, the scheduler priority calculator 404 may be configured to determine a scheduler priority class for a packet using a QoS attribute from the packet. The scheduler priority class can then be used by the scheduler to determine a priority and resources for forwarding that packet to the next hop through the cross-bars 424. The QoS attribute may be selected from a plurality of QoS attributes based on the deployment modelconfiguration. For example, the plurality of QoS attributes may include the MPLC outer TC 316, MPLS inner TC 308 and the DSCP 228. The scheduler priority calculator 404 may include an IP scheduler priority calculator 502, an MPLS scheduler priority calculator 504 and a scheduler priority class selector 506.

The IP scheduler priority calculator 502 may be configured to determine a scheduler priority class for an IP packet using the QoS attribute from the IP packet. In some embodiments, an MPLS action ID 514 may be used in selecting the scheduler priority class for the IP packet. For example, the MPLS action ID 514 may be generated by the IP lookup table 416 or the MPLS lookup table 418. The MPLS action ID 514 may indicate an MPLS action performed by the network device 400, e.g., an MPLS push (BOS) or MPLS push (NOT-BOS). In one instance, the L3 packet may be the IP packet 202 received by the network device 400 when configured as an ingress label edge device. For example, the network device 400 may perform an MPLS push (BOS) operation to encapsulate the IP packet 202 in an ingress LER configuration. The DSCP 228 of the IP packet 202 being encapsulated can be used to get the scheduler priority class.

The network device 400 can support the MPLS push (BOS) operation for both the universal deployment model and the pipe deployment model. The network device 400 can also support the MPLS pop (BOS) operation for the short-pipe deployment model. As discussed with reference to FIG. 3, the network device 400 can continue to pop all the MPLS labels in an egress LER configuration until it identifies the BOS 310, which results in a decapsulated IP packet 202. The DSCP of the decapsulated IP packet 202 can be used to get the scheduler priority class. The IP scheduler priority calculator 502 may include a plurality of IP scheduler priority maps which may be configured to map the DSCP 228 to a scheduler priority class. The IP scheduler priority calculator 502 is further explained in FIG. 6.

Figure 6:
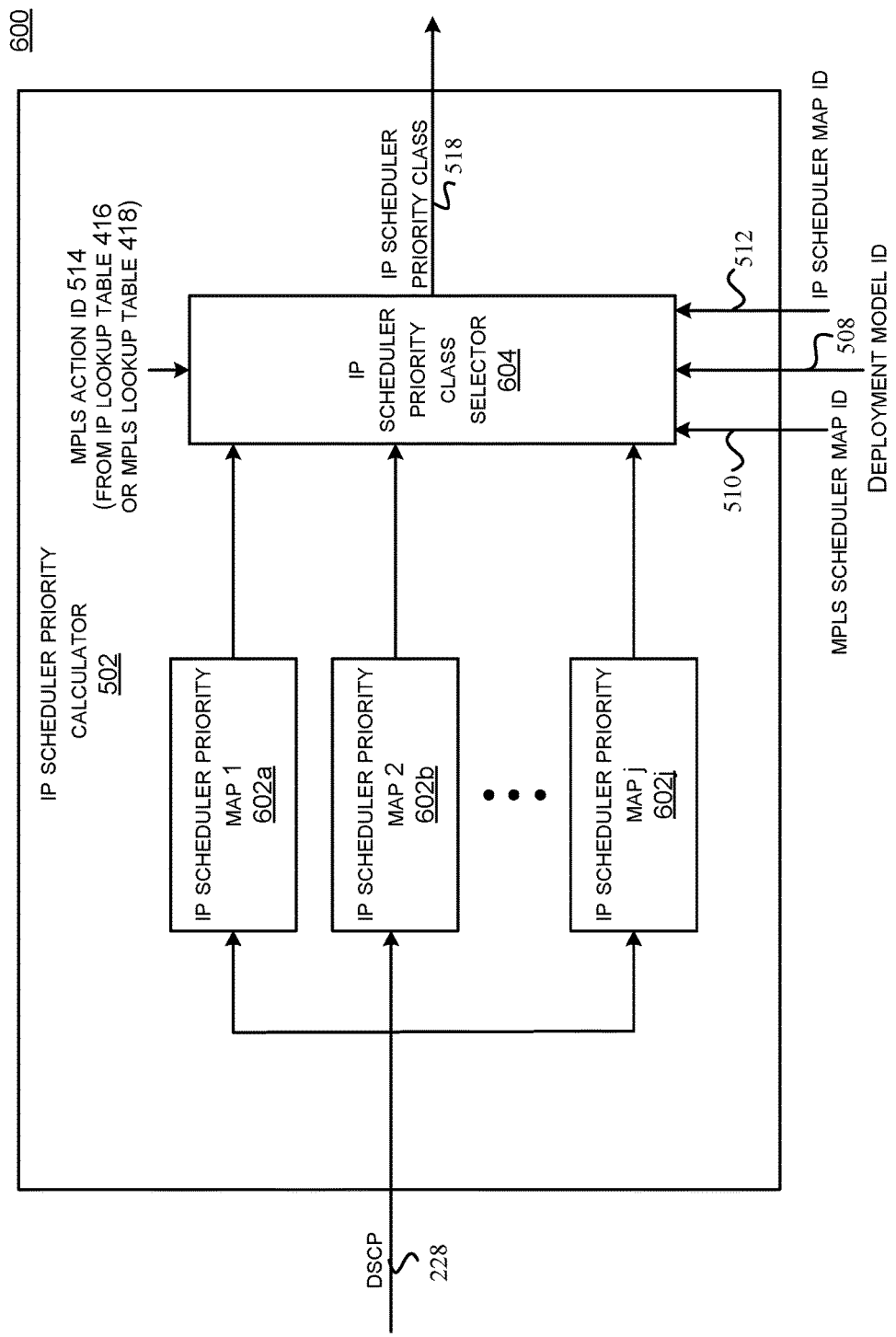
FIG. 6 illustrates a block diagram of an IP scheduler priority calculator, in one embodiment of the disclosed technologies.

FIG. 6 illustrates a block diagram of the IP scheduler priority calculator 502 in one embodiment of the disclosed technology.

The IP scheduler priority calculator 502 may include a plurality of IP scheduler priority maps, e.g., an IP scheduler priority map 1 602a, an IP scheduler priority map 2 602b and an IP scheduler priority map j 602j. Each of the plurality of IP scheduler priority maps may be configured to map the DSCP 228 to a scheduler priority class. The plurality of IP scheduler priority maps 602a-602j may be implemented in software or hardware or a combination thereof. For example, each IP scheduler priority map can be implemented as a lookup table using memories (e.g., SRAMs), registers or a combination thereof. An IP scheduler priority class selector 604 may be configured to select an IP scheduler priority map from the IP scheduler priority maps 602a-602j using an MPLS action ID 514, an MPLS scheduler map ID 510 or an IP scheduler map ID 512. As discussed with reference to FIG. 4, in one embodiment, the MPLS scheduler map ID 510 may be generated by the MPLS lookup table 418 using the MPLS label 208 and the IP scheduler map ID 512 may be generated by the IP lookup table 416 using the IP address. Each IP scheduler priority map may be configured based on the deployment model for a particular label switching path. In some embodiments, configuration of the selected IP scheduler priority map may be different for different deployment models. For example, for the uniform model, different values of the DSCP 228 may map to different scheduler priority classes. For the pipe or short-pipe model, different values of the DSCP 228 may map to the same scheduler priority class.

In one embodiment, when an MPLS push BOS operation is performed by the network device 400 in the ingress LER configuration, the IP scheduler map ID 512 may be used by the IP scheduler priority class selector 604 to select the IP scheduler priority class 518 from the plurality of IP scheduler priority maps 602a-602j. In another embodiment, when the network device 400 implements a short-pipe deployment model in the egress LER configuration, the MPLS scheduler map ID 510 may be used by the IP scheduler priority class selector 604 to select the IP scheduler priority class 518 from the plurality of IP scheduler priority maps 602a-602j. The IP scheduler priority class selector 604 may be implemented using one or more multiplexers or any suitable logic.

Referring back to FIG. 5, the MPLS scheduler priority calculator 504 may be configured to determine a scheduler priority class for an MPLS packet using the QoS attribute of the MPLS packet. For example, the MPLS packet may be the MPLS packet 300 received by the network device 400 in an LSR configuration or an egress LER configuration. The QoS attribute may include the MPLS outer TC 316 or the MPLS inner TC 308 as discussed with reference to FIG. 3. When the network device 400 is configured as an egress label edge device, the QoS attribute used for determining the scheduler priority class can be based on the deployment model implemented by the network device 400 and the MPLS action. For example, for the universal or the pipe deployment model, the MPLS outer TC 316 can be used to determine the scheduler priority class and the MPLS swap, MPLS push (Not BOS), MPLS pop (Not BOS) or MPLS pop (BOS) operations can be supported. For the short-pipe deployment model, the MPLS inner TC 308 can be used to determine the scheduler priority class and the MPLS pop (Not BOS) operation can be supported. The MPLS scheduler priority calculator 504 may include a plurality of MPLS scheduler priority maps which may be configured to map the MPLS outer TC 316 or the MPLS inner TC 308 to a scheduler priority class. The MPLS scheduler priority calculator 504 is further explained in FIG. 7.

Figure 7:
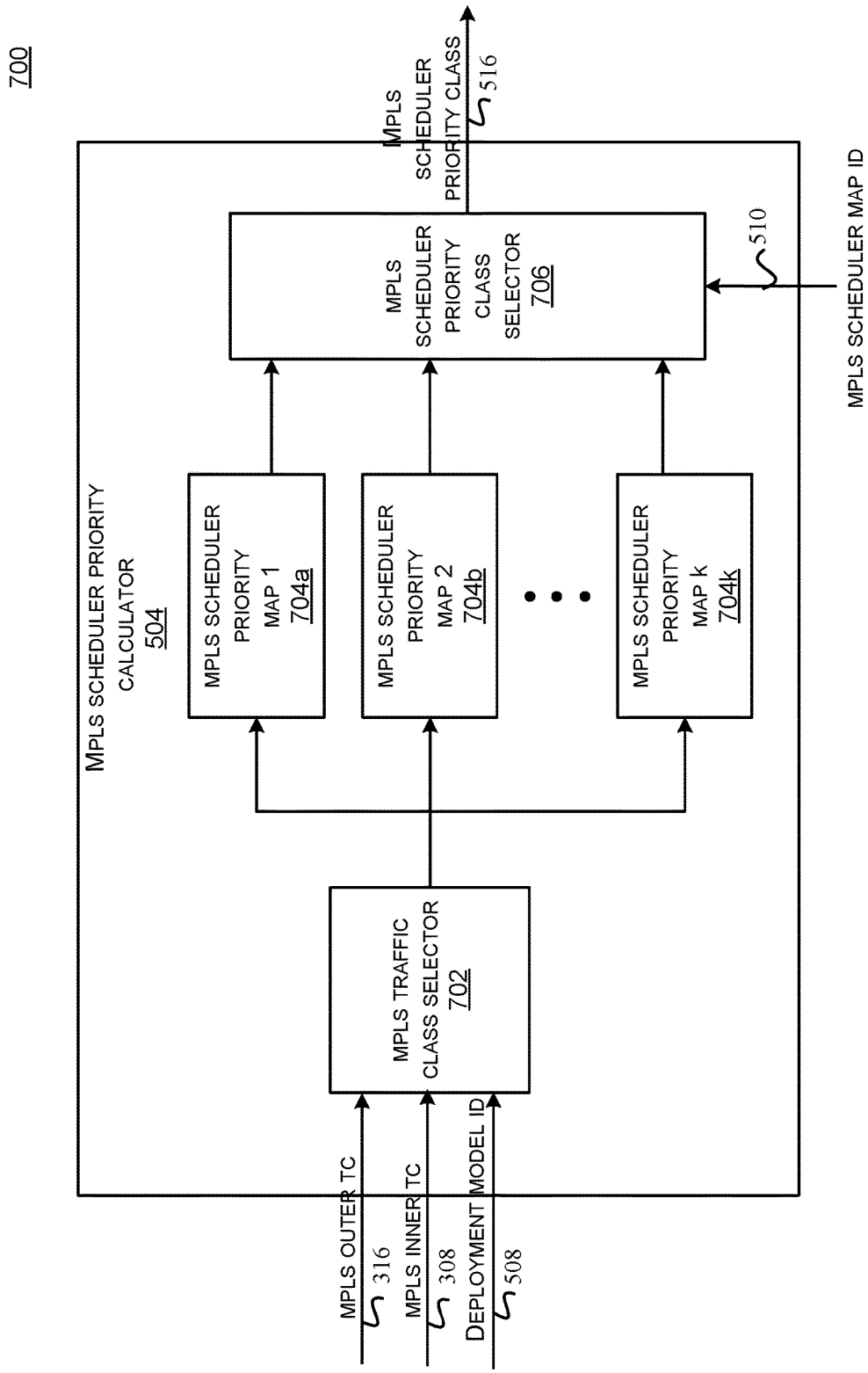
FIG. 7 illustrates a block diagram of an MPLS scheduler priority calculator, in one embodiment of the disclosed technologies.

FIG. 7 illustrates a block diagram of the MPLS scheduler priority calculator 504 in one embodiment of the disclosed technology.

The MPLS scheduler priority calculator 504 may include a plurality of MPLS scheduler priority maps, e.g., an MPLS scheduler priority map 1 704*a*, an MPLS scheduler priority map 2 704*b* and an MPLS scheduler priority map k 704*k*. Each of the plurality of MPLS scheduler priority maps 704*a*-704*k* may be configured to map the MPLS outer TC 316 or the MPLS inner TC 308 to a scheduler priority class. The deployment model ID 508 may be used in selecting the MPLS outer TC 316 or the MPLS inner TC 308. The plurality of MPLS scheduler priority maps 704*a*-704*k* may be implemented in software or hardware or a combination thereof. For example, each MPLS scheduler priority map 704*a*-704*k* can be implemented as a lookup table using memories (e.g., SRAMs), registers or a combination thereof.

An MPLS traffic class selector 702 may determine whether the MPLS outer TC 316 or the MPLS inner TC 308 may be used to map to the scheduler priority class based on the deployment model ID 508. For example, the MPLS traffic class selector 702 may be implemented using a multiplexer or any suitable logic.

An MPLS scheduler priority class selector 706 may be configured to select an MPLS scheduler priority class 516 from the scheduler priority class mapped by each of the plurality of MPLS scheduler priority maps using a MPLS scheduler map ID 510. As discussed with reference to FIG. 4, the MPLS scheduler map ID 510 may be generated by the MPLS lookup table 418 using the MPLS label 208. The MPLS scheduler priority class selector 706 may be implemented using one or more multiplexers or any suitable logic.

Referring back to FIG. 5, the scheduler priority class selector 506 may be configured to determine the scheduler priority class 422 from the MPLS scheduler priority class 516 generated by the MPLS scheduler priority calculator 504 and from the IP scheduler priority class 518 generated by the IP scheduler priority calculator 502 based on the deployment model ID 508 and the MPLS action ID 514. In some embodiments, the scheduler priority class selector 506 may determine the scheduler priority class 422 from the MPLS scheduler priority class 516 for the universal or pipe deployment model. For example, the MPLS scheduler priority class 516 may be generated using the MPLS outer TC 316 for the universal or pipe deployment model, or using the MPLS inner TC 308 for the short-pipe deployment model. In one instance, when an MPLS push (BOS) operation is performed by the network device 400 in the ingress LER configuration, the IP scheduler priority class 518 may be used to generate the scheduler priority class 422. In another instance, when an MPLS pop (BOS) operation is performed by the network device 400 in the egress LER configuration, the IP scheduler priority class 518 may be used to generate the scheduler priority class 422 for the short-pipe deployment model. The scheduler priority class selector 506 may be implemented using multiplexers or any suitable logic.

Figure 8:
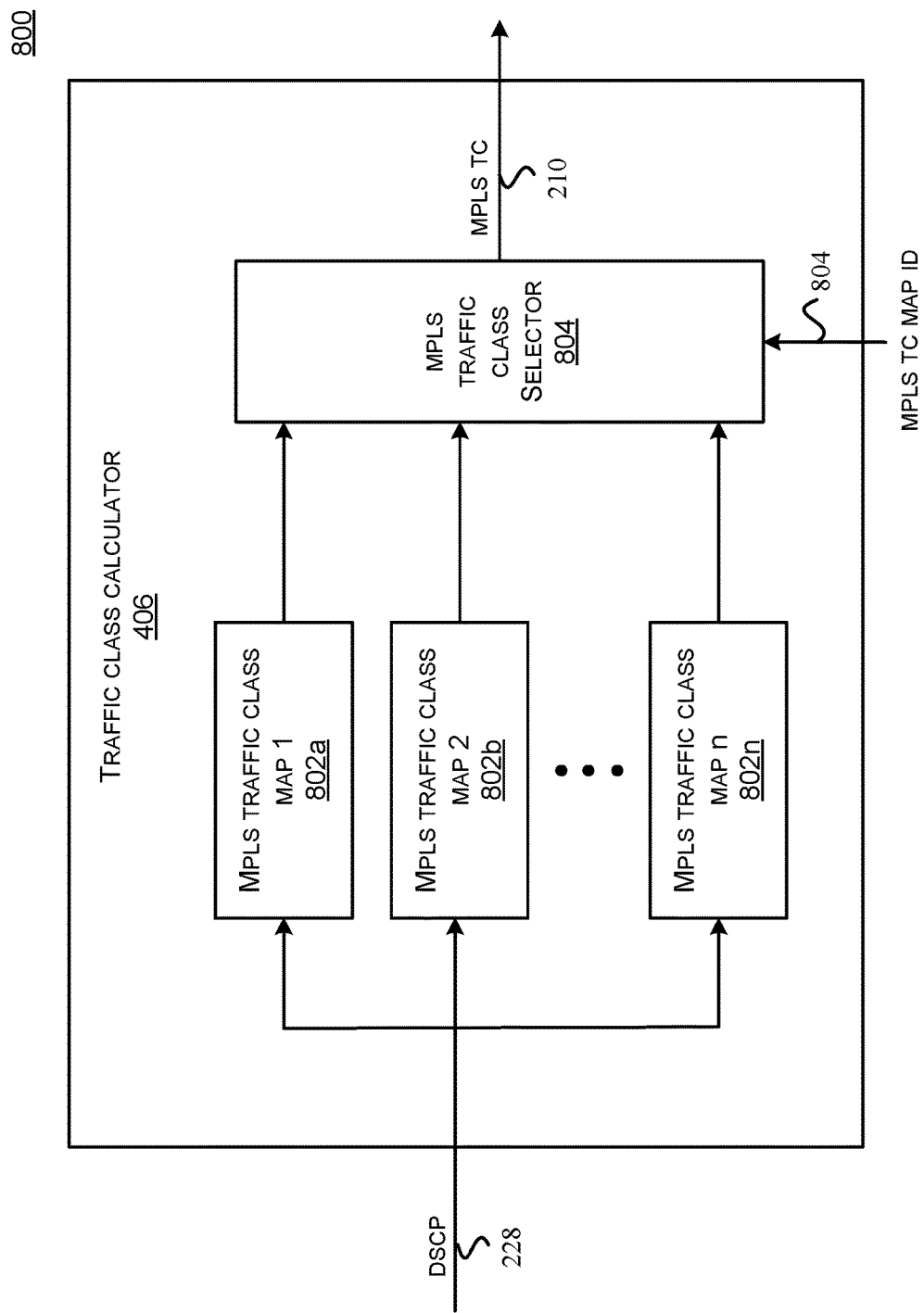
FIG. 8 illustrates a high level block diagram of a traffic class calculator, in one embodiment of the disclosed technologies.

FIG. 8 illustrates a high level block diagram of the traffic class calculator 406, in one embodiment of the disclosed technologies. The traffic class calculator 406 may be configured to map from the IP DSCP of an IP packet to an MPLS traffic class using a configurable traffic class map. The configurable traffic class map can be implemented as a lookup table using memories (e.g., SRAMs), registers or a combination thereof. In one embodiment, the configurable traffic class map can be selected from a plurality of configurable traffic class maps using an IP address provided in the IP packet. The MPLS traffic class generated by the traffic class calculator 406 can be part of an MPLS header that may be used to encapsulate the IP packet for MPLS push operations, when the network device 400 is configured as an ingress label edge device. For example, referring back to FIG. 2, the traffic class calculator 406 may generate the MPLS TC 420 for inserting in the MPLS header 206 used for encapsulating the IP packet 202.

The traffic class calculator 406 may include a plurality of configurable traffic class maps, e.g., a traffic class map 1 802*a*, a traffic class map 2 802*b* and a traffic class map n 802*n*. Each of the plurality of traffic class maps 802*a*-802*n* may be configured to map the DSCP 228 to a corresponding MPLS traffic class. The plurality of traffic class maps 802*a*-802*n* may be implemented in software or hardware or a combination thereof.

An MPLS traffic class selector 804 may be configured to select a traffic class map from the plurality of traffic class maps 802*a*-802*n* using an MPLS TC map ID 804 to generate the MPLS TC 420. The MPLS TC map ID 804 may be generated from the IP address. For example, the MPLS TC map ID 804 may be generated by the IP lookup table 416 as discussed with reference to FIG. 4. The MPLS traffic class selector 804 may be implemented using one or more multiplexers or any suitable logic.

FIG. 9 illustrates the MPLS QoS configuration table 410, in one embodiment of the disclosed technologies. The MPLS QoS configuration table 410 may include MPLS TC update policies and other configuration settings for an LSP that can be used to control the QoS marking of the packet on that LSP. For example, the MPLS TC update policies and the configuration settings can be used by the packet rewriter 412 to update the QoS attributes of the egress packet, e.g., the MPLS inner TC, MPLS outer TC, IP DSCP or the IP ECN. In some embodiments, the MPLS TC update policies and other configuration settings in the MPLS QoS configuration table 410 may be based on the deployment configuration. For example, an entry in the MPLS QoS configuration table 410 may include a first setting for a universal deployment configuration, and a second setting for pipe or a short pipe deployment configuration. In some embodiments, the port specific QoS configuration registers 1008 may be used in place of or in addition to the configuration provided by the MPLS QoS configuration table 410 to update the QoS attributes of the egress packet. The MPLS QoS configuration table 410 shows a description field 902 and a description 904 to describe various entries. In some implementations, the MPLS QoS configuration table 410 may include a plurality of entries for different LSPs. For example, a first set of entries may include the MPLS TC update policies and the configuration settings for a first LSP and a second set of entries may include the MPLS TC update policies and the configuration settings for a second LSP.

A CM code point 906 describes an MPLS TC code point associated with an LSP to represent traffic congestion using the MPLS traffic class. For example, the CM code point 906 may be configured to represent a congestion marked code point from a plurality of code points represented by the MPLS traffic class. The MPLS traffic class may be a three bit field which can be configured to represent eight different code points. In some embodiments, the CM code point 906 may represent one of the eight code points and the remaining seven code points can represent Not-CM code points. Embodiments of the disclosed technologies can allow representation of the CM code point and the Not-CM code points to be configurable for each LSP. For example, the CM code point can be configured as "101" for a first LSP and "111" for a second LSP. In some embodiments, the CM code point 906 can be reconfigured as per a new behavior aggregate when the PSC domains change.

An MPLS TC update policy for MPLS push (Not-BOS) 908 includes a one bit field that can be configured to "1" or "0". In one embodiment, a value of "0" in the field 908 indicates that the MPLS TC of an MPLS inner header can be copied to an MPLS outer header for the MPLS push (Not-BOS) case. A value of "1" in the field 908 indicates that a fresh value present in an MPLS TC for push field 920 can be used. For example, when the network device 400 is configured as a label switching device, for the uniform deployment model, to add an MPLS label on an MPLS stack, the MPLS TC of the top most MPLS header of the MPLS stack can be copied to the MPLS header that is being pushed. For the pipe or short-pipe deployment model, a fresh MPLS TC value, for the MPLS header being pushed, is added, which can be independent of the MPLS TC of the top-most MPLS header of the MPLS stack.

An MPLS TC update policy for MPLS push (BOS) 910 includes a one bit field that can be configured to "1" or "0". In one embodiment, a value of "0" indicates that the MPLS TC generated from the mapping of IP DSCP can be used for the MPLS push (BOS) case. A value of "1" indicates that a fresh value present in the MPLS TC for push field 920 can be used. For example, when the network device 400 is configured as an ingress label edge device, for the uniform deployment model, the MPLS TC 420 can be generated from the DSCP 228 by the traffic class calculator 406 as discussed with reference to FIG. 8. For the pipe or short-pipe deployment model, a fresh MPLS TC value, for the MPLS header being pushed, is added, which can be independent of the MPLS TC of the top-most MPLS header of the MPLS stack.

An MPLS inner TC update policy for MPLS POP with Explicit Null (PHP Not-BOS) 912 includes a two bit field that can be configured to "00", "01", "10" or "11". In some implementations, an MPLS label that is not at the bottom of the stack may be removed at the Penultimate hop of the LSP. For example, when an MPLS TC of the MPLS header that is not at the bottom of the stack is popped, it is replaced with an Explicit Null label at the PHP hop of the LSP. The MPLS TC of the outermost MPLS label (that got converted to an Explicit Null) is updated when changing PSC domains or for congestion marking. The MPLS TC of the popped MPLS explicit null header can be set to CM if the packet is experiencing congestion in the router, e.g., if the congestion notification received from the queues indicates congestion encountered. The MPLS TC of the MPLS header being popped can be copied to the exposed MPLS header if the exposed MPLS TC is not CM. In one embodiment, a value of "00" for the field 912 indicates that an ingress outer TC can be copied to an inner TC only if inner TC is not set to CM. If a congestion notification from the queue indicates congestion, inner TC can be marked as CM, e.g., can be set to include the CM code point 906 value. In one embodiment, a value of "01" for the field 912 indicates that an ingress outer TC can be copied to an inner TC only if inner TC is not set to CM, e.g., for the universal deployment model. If a congestion notification from the queue indicates congestion, outer TC can be marked as CM, e.g., can be set to include the CM code point 906 value. A value of "10" for the field 912 indicates a reserved value and a value of "11" for the field 912 indicates no change, e.g., for the pipe or short pipe deployment model.

An MPLS inner TC update policy for MPLS pop (Not-BOS) without Explicit Null 914 includes a one bit field that can be configured to "1" or "0". In one embodiment, a value of "0" for the field 914 indicates that an ingress outer TC can be copied to inner TC only if inner TC is not marked to CM, e.g., for the universal deployment model. If a congestion notification from the queue indicates congestion, inner TC can be marked as CM, e.g., can be set to include the CM code point 906 value. A value of "1" for the field 914 indicates no change, e.g., for the pipe or short pipe deployment model.

An MPLS inner TC update policy for MPLS pop (Not-BOS) without Explicit Null 914 includes a one bit field that can be configured to "1" or "0". In one embodiment, a value of "0" indicates that an ingress outer TC can be copied to inner TC only if inner TC is not marked to CM. If a congestion notification from the queue indicates congestion, inner TC can be marked as CM, e.g., can be set to include the CM code point 906 value. A value of "1" indicates no change, e.g., for the pipe or short pipe deployment model.

An IP ECN update policy for MPLS pop of the last MPLS label stack (PHP BOS) with Explicit Null 916 includes a one bit field that can be configured to "1" or "0". In some instances, when the MPLS header at the bottom of the stack is popped, it can be replaced with an Explicit Null label at the PHP hop of the LSP. The MPLS TC of the outermost MPLS Label (that got converted to an Explicit Null) can be updated when changing PSC domains or for congestion marking. The MPLS TC of the popped MPLS explicit Null header can be set to CM if the packet is experiencing congestion in the router. The exposed IP header's DSCP and the ECN can be updated based on the deployment model. In one embodiment, a value of "0" for the field 916 indicates that an ingress MPLS TC can be mapped to the ECN only if the ECN is ECT(0) or ECT(1) and MPLS TC includes a CM code point, e.g., for the universal deployment model. If a congestion notification from the queue indicates congestion, the ECN can be marked as CE. A value of "1" for the field 916 indicates no change, e.g., for the pipe or short pipe deployment model.

An IP ECN update policy for MPLS pop of the last MPLS label stack (BOS) without Explicit Null 918 includes a one bit field that can be configured to "1" or "0". In one embodiment, a value of "0" indicates that an ingress MPLS TC can be mapped to an inner ECN only if the ECN is ECT(0) or ECT(1) and MPLS TC includes a CM code point, e.g., for the universal deployment model. If a congestion notification from the queue indicates congestion, the ECN can be marked as CE. A value of "1" indicates no change, e.g., for the pipe or short pipe deployment model.

An MPLS TC for push 920 indicates a fresh MPLS TC value for MPLS push cases. For example, the MPLS TC for push 920 value may be used in short-pipe deployment configuration when an MPLS header is pushed on an MPLS stack or on an IP packet depending on the router configuration.

Figure 10:
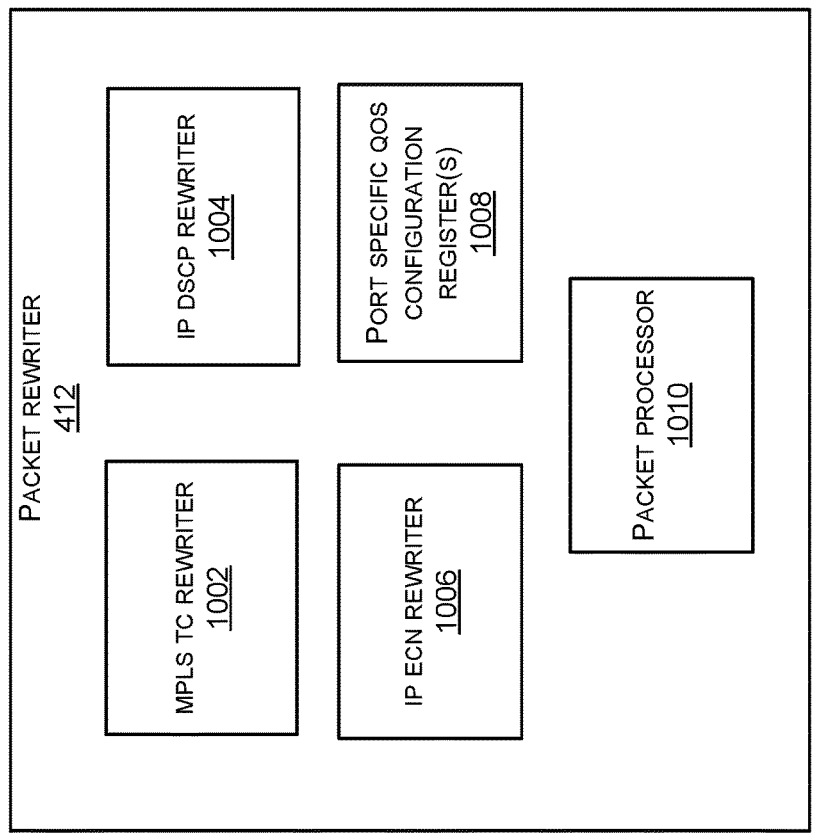
FIG. 10 illustrates a high level block diagram of a packet rewriter, in one embodiment of the disclosed technologies.

FIG. 10 illustrates a high level block diagram of the packet rewriter 412, in one embodiment of the disclosed technologies. The packet rewriter 412 may be configured to update one or more QoS attributes of a packet based on the router configuration, deployment configuration or the MPLS QoS configuration before the packet is forwarded by the output interface 414. The QoS attributes may include the MPLS outer TC, MPLS inner TC, IP DSCP or the IP ECN. The MPLS QoS configuration may be provided by the MPLS QoS configuration table 410 or the port specific QoS configuration registers 1008 as discussed with reference to FIG. 9.

The packet rewriter 412 may be configured to receive a packet received by the input interface 402 via a network port. The packet rewriter 412 may also be configured to receive the MPLS TC, MPLS outer TC, MPLS inner TC or the IP DSCP from the PSC domain changer 408. In some implementations, the packet rewriter 412 may be configured to receive a congestion notification to indicate that the packet under flight has experienced congestion. For example, the congestion notification may be received from an active queue manager (e.g., virtual output queues) in the network device 400. Based on the congestion notification, the packet rewriter 412 may provide appropriate congestion marking to the packet before the packet can be forwarded by the output interface 414. For example, in some instances, the packet rewriter 412 may update the MPLS TC to indicate a pre-configured CM code point (e.g., the CM code point 906) or a Not-CM code point. In some instances, the packet rewriter 412 may update the IP ECN to indicate congestion encountered (CE) code point. In one implementation, the packet rewriter 412 may include an MPLS TC rewriter 1002, an IP DSCP rewriter 1004, an IP ECN rewriter 1006, port specific QoS configuration register(s) 1008 and a packet processor 1010.

The MPLS TC rewriter 1002 may be configured to update the MPLC traffic class for a packet. For example, in one embodiment, the MPLS traffic class may include the MPLS TC 420 generated by the traffic class calculator 406 from the IP DSCP 228, when the network device 400 is configured as the ingress label edge device. In another embodiment, the MPLS traffic class may include the MPLS outer TC 316 or the MPLS inner TC 308 from the MPLS packet 300, when the network device 400 is configured as the label switching device or the egress label edge device. In some embodiments, the MPLS TC rewriter 1002 may be configured to update the MPLS traffic class based on the deployment model configuration and the router configuration. For example, the MPLS TC rewriter 1002 update the MPLS traffic class based on the configuration provided by the MPLS QoS configuration table 410 or the port specific QoS configuration registers 1008 as discussed with reference to FIG. 9.

In one embodiment, the network device 400 may be configured as an ingress label edge device for an LSP and may encapsulate an IP packet (e.g., MPLS push BOS) for forwarding the IP packet through the LSP. Based on the MPLS TC update policy for MPLS push (BOS) 910 field from the MPLS QoS configuration table 410, a value of "0" may indicate to use the MPLS TC generated from the DSCP. For example, the MPLS TC rewriter 1002 may be configured to update the IP packet 202 to insert the MPLS TC 420 generated from the DSCP 228 for the uniform deployment model. A value of "1" for the MPLS TC update policy for MPLS push (BOS) 910 may indicate to insert a pre-configured MPLS TC value that can be independent of the DSCP. For example, the MPLS TC rewriter 1002 may be configured to update the IP packet 202 to insert a pre-configured MPLS TC value that can be independent of the DSCP 228 for the pipe or the short-pipe deployment model. In some implementations, the pre-configured MPLS TC value may be the value programmed in the MPLS TC for push field 920 in the MPLS QoS configuration table 410, as discussed with reference to FIG. 9. In some embodiments, the pre-configured MPLS TC value may be associated with an SLA and may be provided by a service provider.

In some embodiments, the MPLS TC rewriter 1002 may perform a mapping of the ECN to an MPLS TC code point. For example, the MPLS TC rewriter 1002 may be configured to determine if the ECN from the IP packet indicates congestion encountered (e.g., the ECN 230 represents a CE code point). Upon determining that the ECN field of the IP packet header indicates congestion encountered, the MPLS TC rewriter 1002 may set the MPLS traffic class to indicate a code point from the plurality of code points for the MPLS traffic class. For example, the MPLS TC rewriter 1002 may update the MPLS TC value being pushed in the IP header 216 to indicate a congestion marked (CM) code point associated with the LSP. The CM code point may include one out of eight code points represented by the MPLS traffic class of 3 bits. The remaining seven code points may indicate not congestion marked (Not-CM) code points. In some implementations, the CM code point may be a pre-configured value programmed in the CM code point field 906 in the MPLS QoS configuration table 410, as discussed with reference to FIG. 9. In some embodiments, if the congestion notification received by the packet rewriter 412 from the queues indicates congestion encountered, the MPLS TC rewriter 1002 may update the MPLS TC value being pushed in the IP header 216 to indicate a CM code point from the CM code point field 906 associated with the LSP.

In one embodiment, the network device 400 may be configured as a label switching device for an LSP and may perform label switching (e.g., MPLS swap) for forwarding an MPLS packet. For example, the network device 400 may receive an MPLS packet comprising a first MPLS label. The network device 400 may switch the first MPLS label to a second MPLS label for the MPLS packet. In most instances, the MPLS TC value may not be modified when swapping labels. However, the MPLS TC rewriter 1002 may update the MPLS TC value if the congestion notification received by the packet rewriter 412 from the queues indicates congestion encountered. For example, the MPLS TC may be updated to indicate a CM code point as programmed in the CM code point field 906 associated with the LSP from the MPLS QoS configuration table 410.

Figure 11:
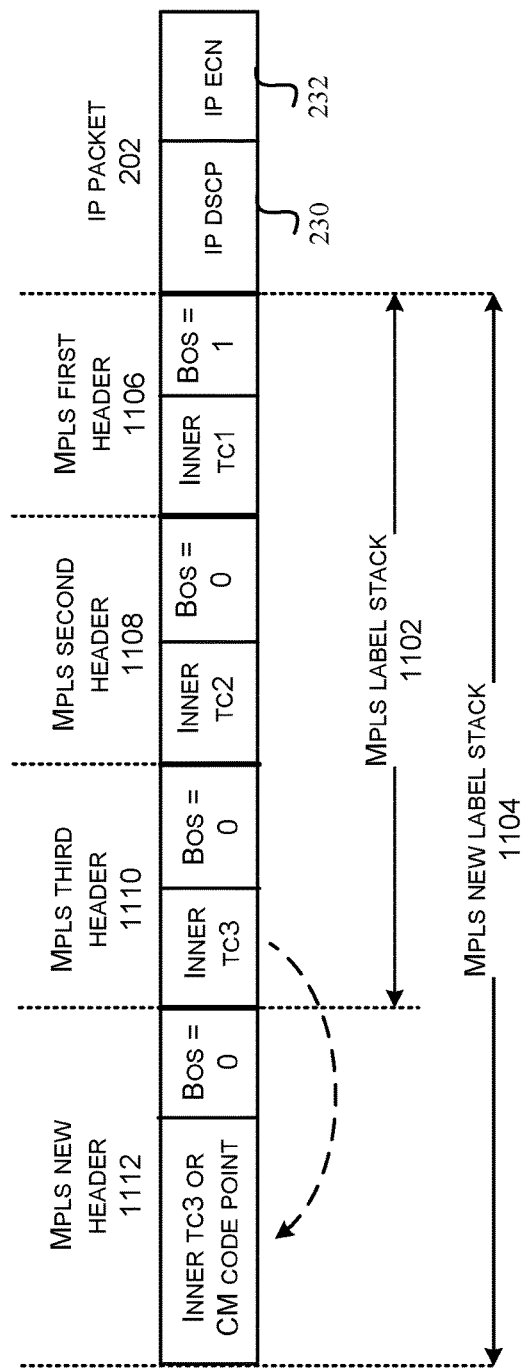
FIG. 11 illustrates adding labels on an MPLS label stack for a uniform deployment model, in one embodiment of the technology.
Figure 12:
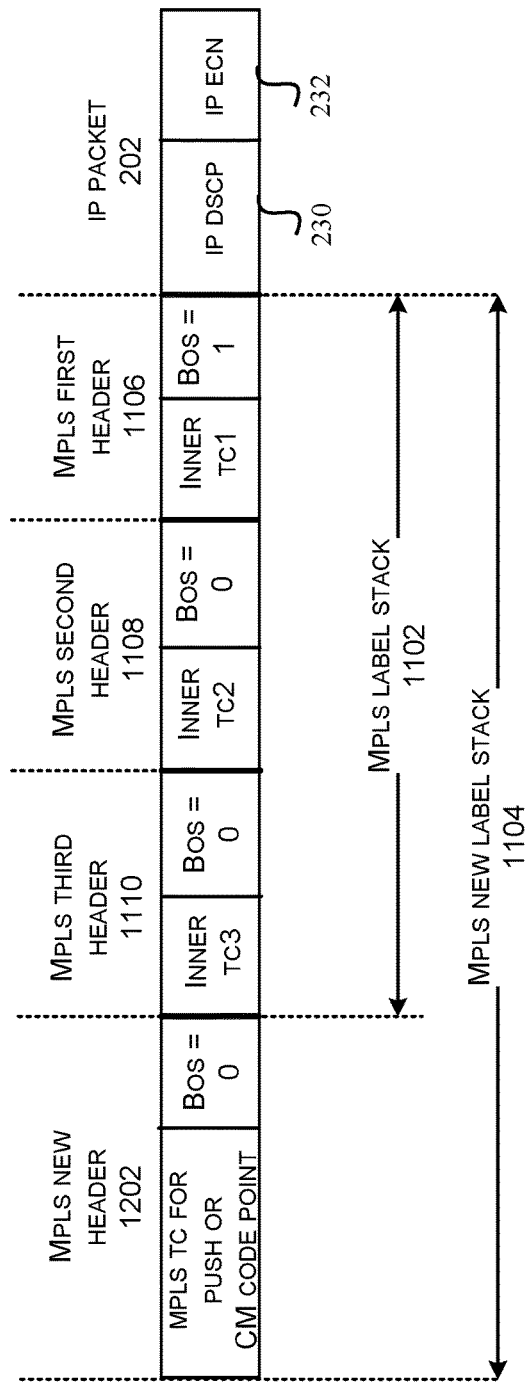
FIG. 12 illustrates adding labels on an MPLS label stack for a pipe or a short-pipe deployment model, in one embodiment of the technology.

In some embodiments, the network device 400 may be configured to insert MPLS labels on an existing MPLS stack (e.g., MPLS push Not-BOS). For example, an MPLS label may be added to an existing MPLS stack to start a new MPLS tunnel. The network device 400 may be a label switching device for a first LSP and a second LSP (existing MPLS tunnels), an ingress label edge device for a third LSP (LSP start) and an egress label edge device for a fourth LSP (LSP end). Thus, some embodiments can allow an LSP end followed by an LSP start. According to some embodiments, the IP DSCP and the ECN can be updated based on the configuration of the LSP end and the MPLS TC for the new MPLS tunnel can be obtained based on the configuration of the LSP start. This is further explained with reference to FIGS. 11 and 12.

An MPLS packet 1100 may include an MPLS label stack 1102 attached to the IP packet 202. The MPLS label stack 1102 may include an MPLS first header 1106, an MPLS second header 1108 and an MPLS third header 1110. The MPLS first header 1106 may include an inner TC1 and a BOS value of "1", the MPLS second header 1108 may include an inner TC2 and a BOS value of "0" and the MPLS third header 1110 may include an inner TC3 and a BOS value of "0." For example, the MPLS third header 1110 may be associated with the first LSP. In one instance, an MPLS new header 1112 may be added to the MPLS label stack 1102 resulting in the MPLS new label stack 1104. In one embodiment, based on the MPLS TC update policy for MPLS push (NOT-BOS) 908 field from the MPLS QoS configuration table 410, a value of "0" may indicate to copy the MPLS TC of the inner MPLS header to the outermost MPLS header. For example, for the uniform deployment model, the MPLS TC rewriter 1002 may be configured to copy the inner TC3 of the MPLS third header 1110 (topmost MPLS header) of the MPLS label stack 1102 to the MPLS new header being pushed. For example, the MPLS new header 1112 may include the inner TC3 and the BOS value of "0." In one embodiment, the MPLS TC rewriter 1002 may update the MPLS new header 1112 to include the CM code point 906 value for the second LSP if the congestion notification received by the packet rewriter 412 from the queues indicates congestion encountered on the second LSP.

In one embodiment, for the pipe or the short-pipe deployment model, the MPLS TC rewriter 1002 may be configured to insert a pre-configured MPLS TC value for a MPLS new header 1202 that is being pushed, which may be independent of the inner TC3 value (topmost MPLS header) of the MPLS label stack 1102. For example, a value of "1" for the MPLS TC update policy for MPLS push (NOT-BOS) 908 field may indicate to insert a pre-configured MPLS TC value. For example, the pre-configured MPLS TC value may be the MPLS TC for push field 920 as programmed in the MPLS QoS configuration table 410. In some embodiments, the pre-configured MPLS TC value may be associated with an SLA and may be provided by a service provider. In one embodiment, the MPLS TC rewriter 1002 may update the MPLS new header 1112 to include the CM code point 906 value for the second LSP if the congestion notification received by the packet rewriter 412 from the queues indicates congestion encountered on the second LSP.

Referring back to FIG. 10, in some embodiments, the MPLS TC rewriter 1002 may be configured to remove MPLS labels from an existing MPLS stack. The MPLS label may be removed from an MPLS header that is at the bottom of the stack (BOS) or from an MPLS header that is not at the bottom of the stack (Not-BOS). For example, referring back to FIG. 11, an MPLS label may be removed from the MPLS first header 1106 (BOS) or from the MPLS third header 1110 (Not BOS). Note that the MPLS outer headers (e.g., the MPLS second header 1108, MPLS third header 1110, and the MPLS new header 1112) may need to be removed before removing the MPLS first header 1106.

In some implementations, an MPLS label that is not at the bottom of the stack may be removed at the Penultimate hop of the LSP. For example, when an MPLS label of the MPLS header that is not at the bottom of the stack is popped, the MPLS TC rewriter 1002 may update the MPLS TC with an Explicit Null label. In one embodiment, the MPLS TC may be updated based on the MPLS inner TC update policy for MPLS pop with Explicit Null (PHP NOT-BOS) 912 field from the MPLS QoS configuration table 410. In some embodiments, if the congestion notification received by the packet rewriter 412 from the queues indicates congestion encountered, the MPLS TC rewriter 1002 may update the MPLS TC of the outermost MPLS label (that got converted to an Explicit Null) to include the CM code point 906 for that LSP. Referring back to FIG. 11, if the MPLS TC of the MPLS third header 1110 is popped, the MPLS TC rewriter 1002 may update the MPLS third header 1110 to include the Explicit Null label.

For the universal deployment model, the MPLS TC rewriter 1002 may update the exposed MPLS header with the MPLS TC of the MPLS header being popped if the exposed MPLS TC is not congestion marked. Referring back to FIG. 11, when the MPLS third header 1110 is popped, the MPLS second header 1108 gets exposed. In some embodiments, the MPLS TC rewriter 1002 may copy the inner TC3 of the MPLS third header 1110 to the MPLS second header 1108 if the inner TC2 of the MPLS second header 1108 is not congestion marked. If the inner TC2 of the MPLS second header 1108 is congestion marked, the MPLS TC rewriter 1002 may update the inner TC3 of the MPLS third header 1110 to include the CM code point 906.

For the pipe or short-pipe deployment model, the MPLS TC of the exposed MPLS header is not changed. Referring back to FIG. 11, the inner TC2 of the MPLS second header 1108 is not updated for the pipe or short-pipe deployment model.

In some embodiments, when an MPLS label that is not at the bottom of the stack is removed at the Penultimate hop of the LSP, the MPLS TC rewriter 1002 may update the MPLS TC without an Explicit Null label. In one embodiment, the MPLS TC may be updated based on the MPLS inner TC update policy for MPLS pop (NOT-BOS) without Explicit Null 914 field from the MPLS QoS configuration table 410. In some embodiments, the MPLS TC rewriter 1002 may copy the inner TC3 of the MPLS third header 1110 to the MPLS second header 1108 if the inner TC2 of the MPLS second header 1108 is not congestion marked. In some embodiments, if the congestion notification received by the packet rewriter 412 from the queues indicates congestion encountered, the MPLS TC rewriter 1002 may update the MPLS TC of the outermost MPLS label to include the CM code point 906 for that LSP.

Referring back to FIG. 10, the IP DSCP rewriter 1004 may be configured to update the IP header's DSCP value when the PSC domains are changed. For example, the IP DSCP value may be updated from a first behavior aggregate to a second behavior aggregate. In one embodiment, when the network device is configured as the ingress label edge device, the IP DSCP rewriter 1004 may update the IP DSCP value used for encapsulation. In one embodiment, when the network device 400 is configured as the egress label edge device, the IP DSCP rewriter 1004 may update the decapsulated IP DSCP value to a value from the second behavior aggregate.

Referring back to FIG. 10, the IP ECN rewriter 1006 may be configured to update the IP ECN of the IP header, when the network device is configured as the PHP label switching device or the egress label edge device. When MPLS headers are popped, the IP DSCP of the decapsulated IP packet is not changed irrespective of the MPLS deployment model. The IP ECN rewriter 1006 may be configured to update the newly exposed IP header with the congestion marking of the popped MPLS header. In some embodiments, the IP ECN rewriter 1006 may update the IP ECN of the newly exposed IP header to "CE" if the MPLS TC of the popped MPLS header includes CM code point 906. If the congestion notification received by the packet rewriter 412 from the queues indicates congestion encountered, the IP ECN can be updated to indicate CE if the IP ECN is ECT(0) or ECT(1).

In some implementations, an MPLS label that is at the bottom of the stack may be removed at the Penultimate hop of the LSP. For example, when an MPLS TC of the MPLS header that is at the bottom of the stack is popped, the MPLS TC rewriter 1002 may update the MPLS TC with an Explicit Null label. In some embodiments, if the congestion notification received by the packet rewriter 412 from the queues indicates congestion encountered, the MPLS TC rewriter 1002 may update the MPLS TC of the outermost MPLS label (that got converted to an Explicit Null) to include the CM code point for that LSP. Referring back to FIG. 11, if the inner TC1 of the MPLS first header 1106 is popped, the MPLS TC rewriter 1002 may update the MPLS first header 1106 to include the Explicit Null label. The IP ECN rewriter 1006 may be configured to update the IP ECN of the exposed IP packet 202 based on the IP ECN update policy for MPLS POP of the last MPLS label stack (PHP BOS) with Explicit Null 916 field or the IP ECN update policy for MPLS POP of the last MPLS label stack (BOS) without Explicit Null 918 field for different deployment models.

For the universal deployment model, the IP ECN rewriter 1006 may update the IP ECN of the newly exposed IP header to "CE" if the MPLS TC of the popped MPLS header includes CM code point 906. If the congestion notification received by the packet rewriter 412 from the queues indicates congestion encountered, the IP ECN can be updated to indicate CE if the IP ECN is ECT(0) or ECT(1).

For the pipe or short-pipe deployment model, the IP ECN of the exposed IP packet 202 is not changed. Referring back to FIG. 11, the inner TC2 of the MPLS second header 1108 is not updated for the pipe or the short-pipe deployment model.

Referring back to FIG. 10, in some embodiments, the port specific QoS configuration registers 1008 may be configured to include QoS configuration settings for the egress interface for a specific LSP. For example, the port specific QoS configuration registers 1008 may include a plurality of configuration registers. A first configuration register may include configuration settings for a first LSP and a second configuration register may include configuration settings for a second LSP, etc. These settings may be similar to the QoS configuration settings from the MPLS QoS configuration table 410 as discussed with reference to FIG. 4. In some embodiments, the port specific QoS configuration registers 1008 may be used in place of or in addition to the configuration provided by the MPLS QoS configuration table 410 to update the QoS attributes of the egress packet, e.g., the MPLS inner TC, MPLS outer TC, IP DSCP or the IP ECN.

The packet processor 1010 may be configured to process the packet to perform encapsulation or decapsulation of the packet. For example, in some implementations, the packet processor 1010 may be configured to decapsulate an MPLS packet received via a physical network port or via the input interface 402. The MPLS packet may include one or more MPLS headers imposed on an IP packet. In some implementations, the decapsulation may be performed by the input interface 402. The packet processor 1010 may be configured to encapsulate a packet with an MPLS header. For example, the packet processor 1010 may encapsulate an IP packet with an MPLS header or an MPLS packet with another MPLS label for an MPLS label stack. In some implementations, the MPLS header may be generated by the packet processor 1010 using the MPLS traffic class. For example, the MPLS traffic class may be the MPLS TC updated by the MPLS TC rewriter 1002 based on the update policies configured in the MPLS QoS configuration table 410. In some implementations, the encapsulation may be performed by the output interface 414.

In some embodiments, the packet rewriter 412 may be configured to support MPLS fast re-route (FRR) label push and MPLS FRR label pop. Fast reroutes can provide link protection for an LSP. For example, under a failure condition, all the traffic carried by the LSP can be rerouted through a backup link. In some implementations, an FRR label can be attached to a packet for each backup link. In some embodiments, the FRR label pushes can be handled like and can have the same configuration options like MPLS push operation on MPLS stack. For example, referring back to FIG. 11, an FRR label can be pushed on the MPLS label stack 1102. In some embodiments, if the router is experiencing congestion, the MPLS TC of the FRR MPLS header can be set to the CM code point 906. In some embodiments, popping of the FRR labels can be handled like and can have the same configuration options like the MPLS pop operation. For example, removing of the FRR labels from an MPLS stack can be performed similar to the MPLS pop operation as discussed with reference to FIG. 11 and FIG. 12.

In some embodiments, the packet rewriter 412 may support adding and removing entropy labels on a packet. Entropy labels may be used to implement load balancing on an LSP and may not be used for routing. In some implementations, an entropy label may be a twenty bit label that can be derived from a hash function.

In some embodiments, an entropy label may be added to an L3 header, e.g., an IP header. In one implementation, adding an entropy label can include adding an entropy label (EL) followed by the addition of an entropy label indicator (ELI) on top of the entropy label. Entropy labels pushes can be handled similar to the MPLS push on IP headers (e.g., encapsulating L3 packets) and can have similar configuration options except the ELI and the EL have the same MPLS TC. When the router is experiencing congestion, all MPLS labels (EL and ELI) that are being pushed can be marked for congestion by changing the MPLS TCs to CM code point 906.

In some embodiments, entropy labels pushes can be handled similar to the MPLS push on MPLS stack (e.g., adding labels on an MPLS stack) and can have similar configuration options except the MPLS TC of the EL cannot be used to update the MPLS TC from the MPLS inner header. Only the ELI's MPLS TC can be used to update the MPLS header's MPLS. When the router is experiencing congestion, all MPLS labels (EL and ELI) that are being pushed can be marked for congestion by changing the MPLS TCs to CM code point 906.

In some embodiments, entropy labels pushes can be handled similar to the MPLS Pop on MPLS stack (removing labels from MPLS stack) and can have similar configuration options except the MPLS TC of the EL cannot be used to update the MPLS TC of the MPLS inner header. Only the ELI's MPLS TC can be used to update the MPLS header's MPLS.

In some embodiments, entropy labels pushes can be handled similar to the LSP end (decapsulating L3 Packets (IP Packets)) and can have similar configuration options except the MPLS TC of the EL cannot be used to update the inner IP header (for cases where PSC domains are changed).

Only the ELI's MPLS TC can be used to update the IP header's DSCP value (for cases where PSC domains are changed).

Figure 13:
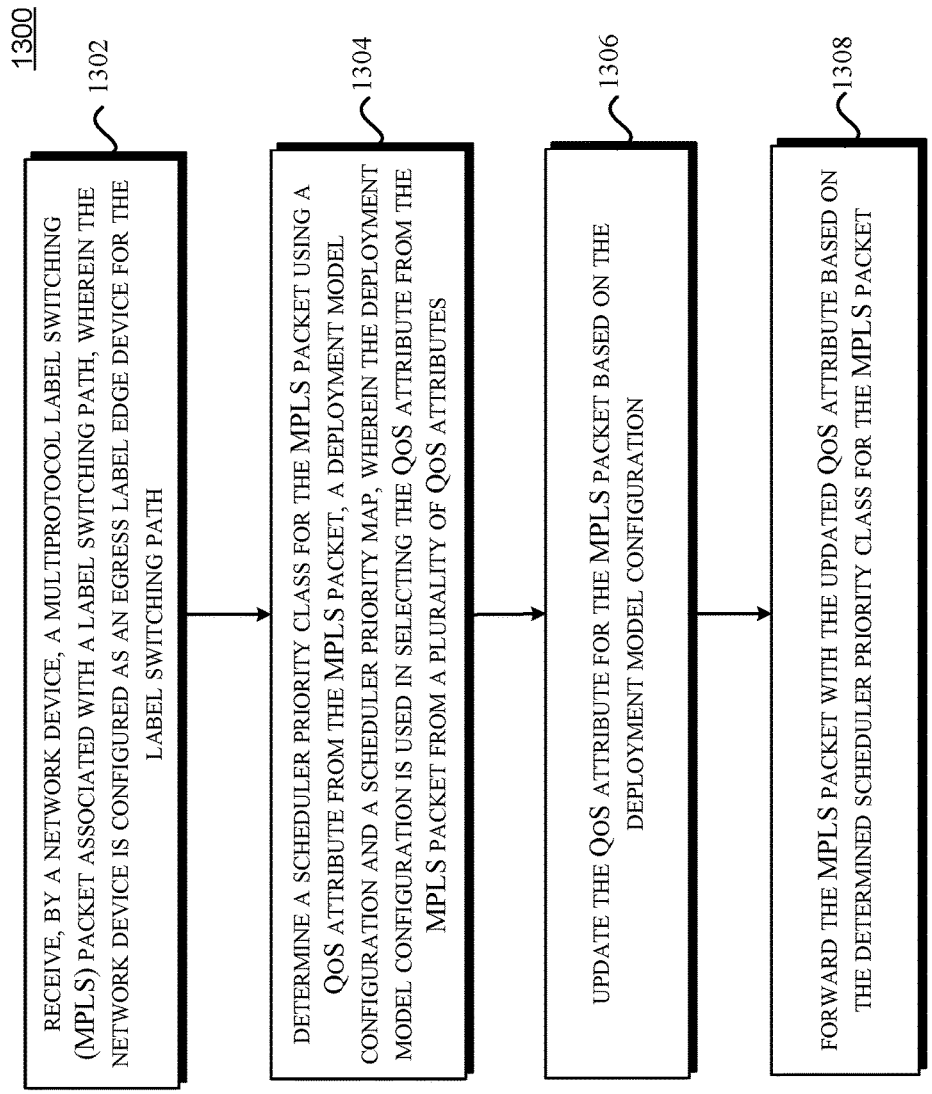
FIG. 13 illustrates a method performed by the network device configured as an egress label edge device for a label switching path, in one embodiment of the disclosed technologies.

FIG. 13 illustrates a method 1300 performed by the network device 400, in one embodiment of the disclosed technologies. The network device 400 may be configured as the egress label edge device for a label switching path. For example, the network device 400 may be similar to the egress label edge device 106 for the LSP 116.

In step 1302, the network device 400 may receive an MPLS packet associated with an LSP. For example, the MPLS packet may be similar to the MPLS packet 300 as discussed with reference to FIG. 3. The MPLS packet may include one or more MPLS headers encapsulating the IP packet 202. The MPLS packet may be received by the input interface 402 as discussed with reference to FIG. 4.

In step 1304, the network device 400 may determine a scheduler priority class for the MPLS packet using a QoS attribute from the MPLS packet, a deployment model configuration and a scheduler priority map. For example, the plurality of QoS attributes may include the DSCP 228, ECN 230, MPLC inner TC 308 or the MPLS outer TC 316. As discussed with reference to FIG. 5, the scheduler priority calculator 404 may determine the scheduler priority class 422 for the MPLS packet. The deployment model configuration may be used in selecting the QoS attribute from the MPLS packet from the plurality of QoS attributes. In some embodiments, the QoS configuration provided by the MPLS QoS configuration table 410 or by the port specific QoS configuration registers 1008 may be used in selecting the QoS attribute. For example, configuration of the MPLS QoS configuration table 410 or by the port specific QoS configuration registers 1008 may be based on the deployment model configuration as discussed with reference to FIG. 9.

For a uniform or a pipe deployment model, the MPLS TC of the outermost MPLS header (e.g., MPLS outer TC 316) may be selected from the plurality of QoS attributes. Further, as discussed with reference to FIG. 7, the MPLS scheduler priority calculator 504 may map the MPLS outer TC 316 to the MPLS scheduler priority class 516 using the scheduler priority map. The scheduler priority map may be selected from the MPLS scheduler priority maps 704a-704k using the MPLS scheduler map ID 510.

For a short-pipe deployment model, the IP DSCP of the MPLS packet being decapsulated may be selected from the plurality of QoS attributes. Further, as discussed with reference to FIG. 6, the IP scheduler priority calculator 502 may map the DSCP 228 to the IP scheduler priority class 518 using the scheduler priority map. The scheduler priority map may be selected from the IP scheduler priority maps 602a-602j using the MPLS scheduler map ID 510 or the IP scheduler map ID 512.

As discussed with reference to FIG. 5, the scheduler priority class selector 506 may determine the scheduler priority class 422 based on the MPLS scheduler priority class 516, IP scheduler priority class 518 and the deployment model ID 508. The scheduler priority class selector 506 may send the scheduler priority class 422 to the scheduler 426. The scheduler 426 may determine a priority for forwarding the egress packet through the cross-bars 424 based on the scheduler priority class 422.

In step 1306, the network device 400 may update the QoS attribute for the MPLS packet based on the deployment model configuration. For example, the packet rewriter 412 may update the DSCP 228, ECN 230, MPLC inner TC 308 or the MPLS outer TC 316 based on the deployment model configuration. For example, for a uniform or a pipe deployment model, the ECN 230 may be updated to CE if the ECN 230 indicates ECT(0) or ECT(1) and MPLS TC of the popped MPLS header indicates congestion marked. In some embodiments, the ECN 230 may be updated to CE if the network device 400 is experiencing congestion (e.g., based on the congestion notification from an active queue manager in the network device 400).

In step 1308, forward the MPLS packet with the updated QoS attribute with the determined scheduler priority class for the MPLS packet. As discussed with reference to FIG. 4, the output interface 414 may forward the MPLS packet with the updated IP ECN 230 to the next hop based on the priority scheduling by the cross-bars 424.

Figure 14:
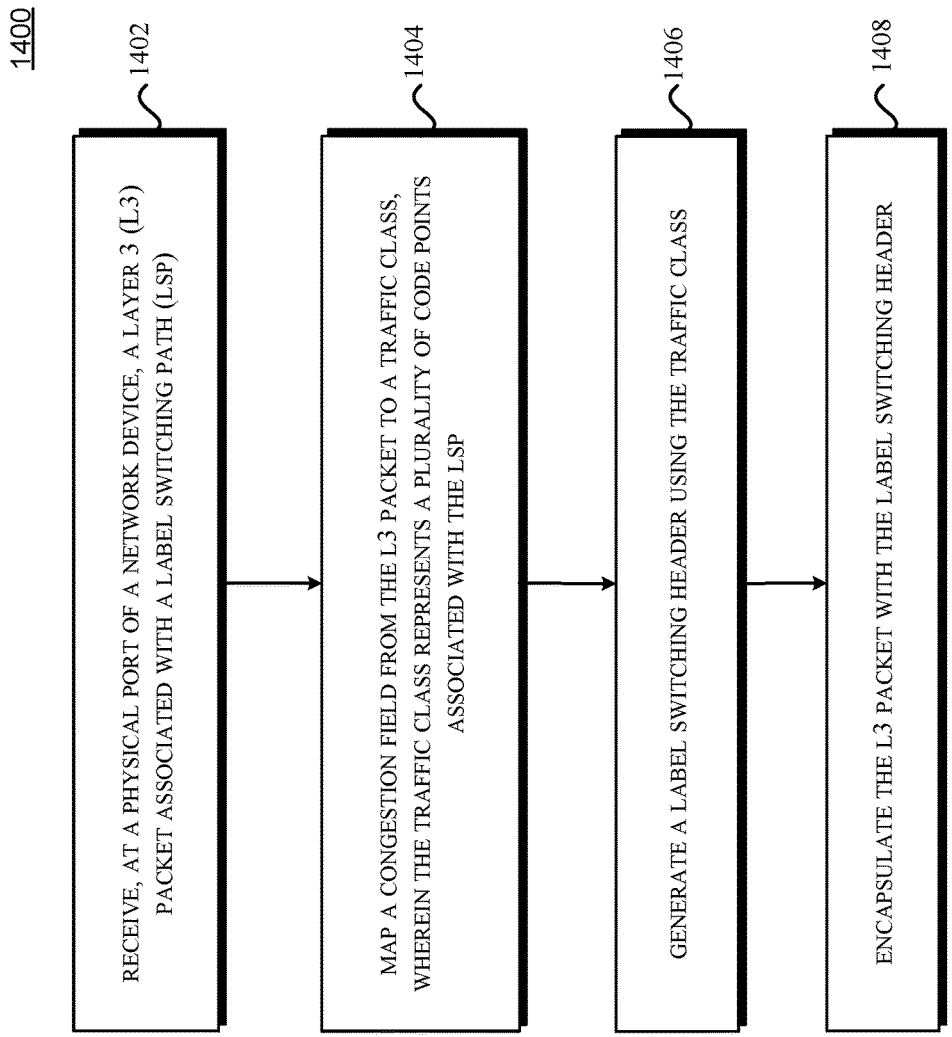
FIG. 14 illustrates a method performed by the network device configured as an ingress label edge device for a label switching path, in one embodiment of the disclosed technologies.

FIG. 14 illustrates a method 1400 performed by the network device 400, in one embodiment of the disclosed technologies. The network device 400 may be configured as an ingress label edge device for a label switching path. For example, the network device 400 may be similar to the ingress label edge device 102 for the LSP 116.

In step 1402, the network device 400 may receive a Layer 3 (l3) packet at a physical port of the network device 400. For example, the L3 packet may be an IP packet associated with an LSP. The IP packet may be received by the input interface 402 or the packet rewriter 412. The IP packet may be similar to the IP packet 202 as discussed with reference to FIG. 2. The IP packet may include a congestion field. For example, the IP packet may include the ECN field 230.

In step 1404, the network device may map the congestion field from the L3 packet to a traffic class. For example, the network device 400 may map the ECN field from the IP packet to a multiprotocol label switching (MPLS) traffic class. The MPLS traffic class may represents a plurality of code points. According to some embodiments, the plurality of code points may include one CM code point and seven Non-CM code points. For example, the CM code point may be the CM code point 906 configured for the particular LSP. In some implementations, the packet rewriter 412 may perform mapping of the ECN 230 to a MPLS TC code point. The mapping may include determining that the ECN 230 from the IP packet 202 indicates congestion encountered (CE) code point. The code point can be the CM code point and may indicate congestion encountered by the IP packet. As discussed with reference to FIG. 10, the MPLC TC rewriter 1002 may determine that the ECN 230 from the IP packet 202 indicates CE code point and can set the MPLS traffic class to indicate the congestion marked (CM) code point from the plurality of code points for the MPLS traffic class. The CM code point may indicate congestion encountered by the IP packet 202.

In step 1406, the network device generates a label switching header using the traffic class. For example, the network device 400 generates an MPLS header using the MPLS traffic class. As discussed with reference to FIG. 10, the MPLS header may be generated by the packet processor 1010 using the MPLS traffic class determined by the MPLC TC rewriter 1002.

In step 1408, the network device encapsulates the L3 packet with the label switching header. For example, the network device 400 encapsulates the IP packet with the MPLS header. As discussed with reference to FIG. 10, the packet processor 1010 may encapsulate the IP packet with the MPLS header. The encapsulated packet can be forwarded by the output interface 414 via a network port. For example, the encapsulated packet may be forwarded to another network device that may be configured as a label switching router for that LSP.

Figure 15:
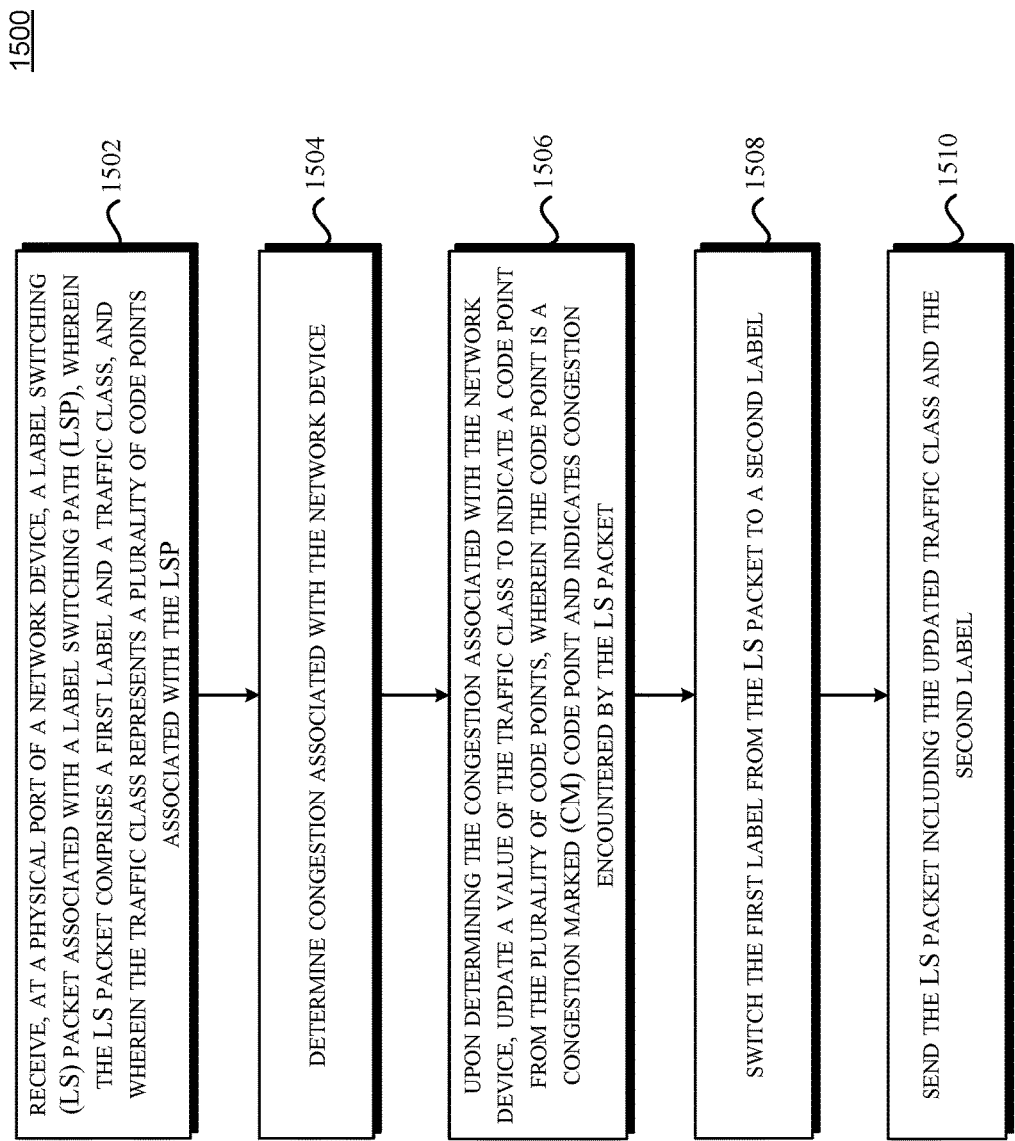
FIG. 15 illustrates a method performed by the network device configured as a label switching device for a label switching path, in one embodiment of the disclosed technologies.

FIG. 15 illustrates a method 1500 performed by the network device 400, in one embodiment of the disclosed technologies. The network device 400 may be configured as a label switching device for a label switching path. For example, the network device 400 may be similar to the label switching device 104 for the LSP 116.

In step 1502, the network device receives, at a physical port, a label switching (LS) packet associated with a label switching path (LSP). The LS packet comprises a first label and a traffic class, wherein the traffic class represents a plurality of code points associated with the LSP. For example, the network device 400 may receive the MPLS packet 204. As discussed with reference to FIG. 2, the MPLS packet 204 may include the MPLS label 208 and the MPLS traffic class 210. The MPLS traffic class 210 may represent a plurality of code points.

In step 1504, the network device may determine congestion associated with the network device. For example, the network device 400 may determine congestion based on a congestion notification received from an active queue manager within the network device 400.

In step 1506, upon determining the congestion associated with the network device, the network device updates a value of the traffic class to indicate a code point from the plurality of code points, wherein the code point is a congestion marked (CM) code point and indicates congestion encountered by the LS packet. For example, upon determining the congestion, the network device 400 may update the MPLS traffic class 210 to include the CM code point 906 associated with the LSP as discussed with reference to FIG. 9.

In step 1508, the network device may switch the first label from the LS packet to a second label. For example, the network device 400 may be configured as a label switching device and may switch the label from a first MPLS label to a second MPLS label. The second MPLS label may be used to route the LS packet to the next hop on the LSP.

In step 1510, the network device may the send the LS packet including the updated traffic class and the second label. For example, the network device 400 may send the MPLS packet including the updated traffic class indicating the CM code point 906, and the second MPLS label. The updated traffic class with the CM code point 906 may indicate that the LSP is experiencing congestion and may send an indication to the source of the packet to slow down the transmission of the packets.

As discussed with reference to FIGS. 4-15, various embodiments can provide flexibility for the customers to implement different deployment models using the same router thus minimizing costs to the customers and the service providers. The same router can be used as an edge router or a label switching router for different LSPs. At the edge routers, QoS markings of the encapsulated or decapsulated packets can be transferred in multiple configurable ways to provide flexibility for the customers to implement different deployment models. Some embodiments of the disclosed technologies can provide a configurable method to determine a scheduler priority class for the packet. Some embodiments can provide explicit congestion notification in the router using the MPLS traffic class. For example, one MPLS traffic class code point can be configured as a congestion marked (CM) code point and the remaining MPLS traffic class code points can be configured as not congestion marked (Not CM). Thus, the embodiments can allow flexibility and maximum utilization of the MPLS traffic class code points. Some embodiments can also provide flexibility for the LSP to change PSC (Per-hop behavior Service Class) domains by allowing for the MPLS traffic class and IP DSCP value to be remapped to a different behavior aggregate. Thus, embodiments of the technologies can provide a unified quality of service for implementing various SLAs using a flexible configuration approach.

Figure 16:
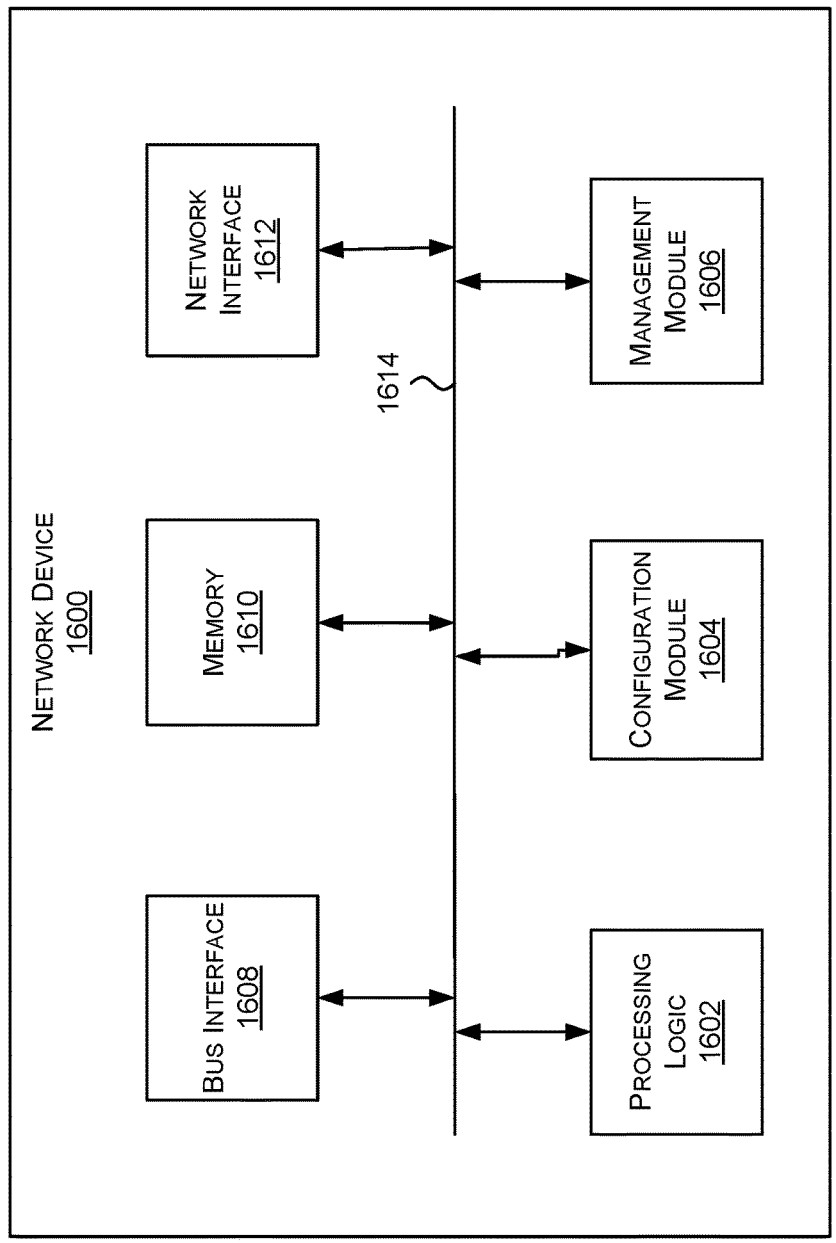
FIG. 16 illustrates an example architecture for features and systems described herein that includes one or more service provider computers and/or a user device connected via one or more networks, according to some embodiments.

FIG. 16 illustrates an example of a network device 1600. Functionality and/or several components of the network device 1600 may be used without limitation with other embodiments disclosed elsewhere in this disclosure, without limitations. For example, some components of the network device 1600 may be used by the network device 400 described with reference to FIG. 4. A network device 1600 may facilitate processing of packets and/or forwarding of packets from the network device 1600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1600 may be the recipient and/or generator of packets. In some implementations, the network device 1600 may modify the contents of the packet before forwarding the packet to another device. The network device 1600 may be a peripheral device coupled to another computer device, a switch, a router or any other suitable device enabled for receiving and forwarding packets.

In one example, the network device 1600 may include processing logic 1602, a configuration module 1604, a management module 1606, a bus interface module 1608, memory 1610, and a network interface module 1612. These modules may be hardware modules, software modules, or a combination of hardware and software. In certain instances, modules may be interchangeably used with components or engines, without deviating from the scope of the disclosure. The network device 1600 may include additional modules, not illustrated here, such as components discussed with respect to the nodes disclosed in FIG. 16. In some implementations, the network device 1600 may include fewer modules. In some implementations, one or more of the modules may be combined into one module. One or more of the modules may be in communication with each other over a communication channel 1614. The communication channel 1614 may include one or more busses, meshes, matrices, fabrics, a combination of these communication channels, or some other suitable communication channel.

The processing logic 1602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1602 may be stored on a computer-readable storage medium, for example, in the form of a computer program. The computer-readable storage medium may be non-transitory. In some cases, the computer-readable medium may be part of the memory 1610.

The memory 1610 may include either volatile or non-volatile, or both volatile and non-volatile types of memory. The memory 1610 may, for example, include random access memory (RAM), read only memory (ROM), Electrically Erasable Programmable Read-Only Memory (EEPROM), flash memory, and/or some other suitable storage media. In some cases, some or all of the memory 1610 may be internal to the network device 1600, while in other cases some or all of the memory may be external to the network device 1600. The memory 1610 may store an operating system comprising executable instructions that, when executed by the processing logic 1602, provides the execution environment for executing instructions providing networking functionality for the network device 1600. The memory may also store and maintain several data structures and routing tables for facilitating the functionality of the network device 1600.

In some implementations, the configuration module 1604 may include one or more configuration registers. Configuration registers may control the operations of the network device 1600. In some implementations, one or more bits in the configuration register can represent certain capabilities of the network device 1600. Configuration registers may be programmed by instructions executing in the processing logic 1602, and/or by an external entity, such as a host device, an operating system executing on a host device, and/or a remote device. The configuration module 1604 may further include hardware and/or software that control the operations of the network device 1600.

In some implementations, the management module 1606 may be configured to manage different components of the network device 1600. In some cases, the management module 1606 may configure one or more bits in one or more configuration registers at power up, to enable or disable certain capabilities of the network device 1600. In certain implementations, the management module 1604 may use processing resources from the processing logic 1602. In other implementations, the management module 1606 may have processing logic similar to the processing logic 1602, but segmented away or implemented on a different power plane than the processing logic 1602.

The bus interface module 1608 may enable communication with external entities, such as a host device and/or other components in a computing system, over an external communication medium. The bus interface module 1608 may include a physical interface for connecting to a cable, socket, port, or other connection to the external communication medium. The bus interface module 1608 may further include hardware and/or software to manage incoming and outgoing transactions. The bus interface module 1608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1608 may include the physical layer for any of these bus protocols, including a connector, power management, and error handling, among other things. In some implementations, the network device 1600 may include multiple bus interface modules for communicating with multiple external entities. These multiple bus interface modules may implement the same local bus protocol, different local bus protocols, or a combination of the same and different bus protocols.

The network interface module 1612 may include hardware and/or software for communicating with a network. This network interface module 1612 may, for example, include physical connectors or physical ports for wired connection to a network, and/or antennas for wireless communication to a network. The network interface module 1612 may further include hardware and/or software configured to implement a network protocol stack. The network interface module 1612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1600 may include multiple network interface modules, each configured to communicate with a different network. For example, in these implementations, the network device 1600 may include a network interface module for communicating with a wired Ethernet network, a wireless 802.11 network, a cellular network, an Infiniband network, etc.

The various components and modules of the network device 1600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 16.

Figure 17:
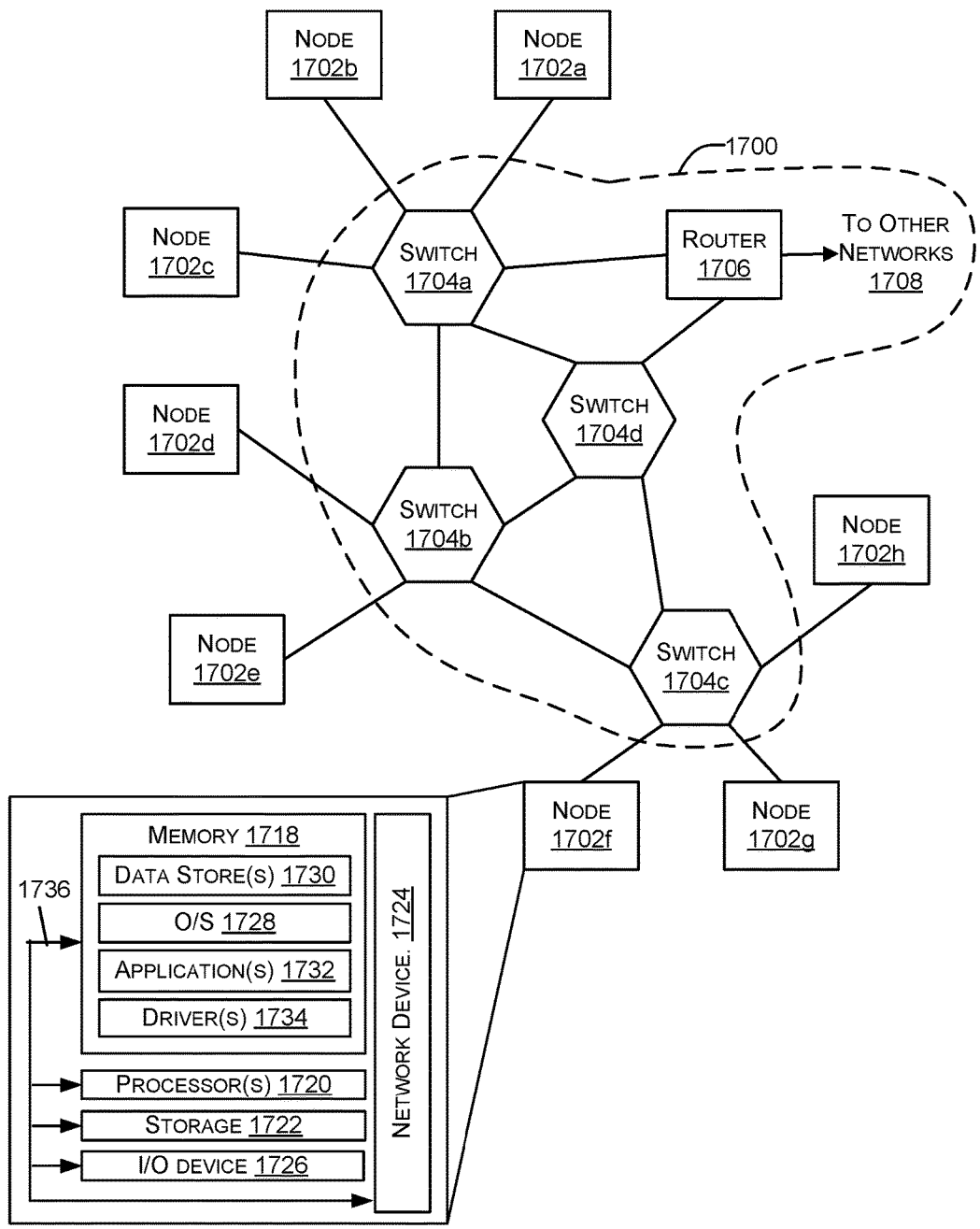
FIG. 17 illustrates aspects of an example environment of a computing system for implementing aspects in accordance with some embodiments.

FIG. 17 illustrates a network 1700, illustrating various different types of network devices 1600 of FIG. 16, such as nodes comprising the network device, switches and routers. In certain embodiments, the network 1700 may be based on a switched architecture with point-to-point links. As illustrated in FIG. 17, the network 1700 includes a plurality of switches 1704a-1704d, which may be arranged in a network. In some cases, the switches are arranged in a multi-layered network, such as a Clos network. A network device 1600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1704a-1704d may be connected to a plurality of nodes 1702a-1702h and provide multiple paths between any two nodes.

The network 1700 may also include one or more network devices 1600 for connection with other networks 1708, such as other subnets, LANs, wide area networks (WANs), or the Internet, and may be referred to as routers 1706. Routers use headers and forwarding tables to determine the best path for forwarding the packets, and use protocols such as internet control message protocol (ICMP) to communicate with each other and configure the best route between any two devices.

In some examples, network(s) 1700 may include any one or a combination of many different types of networks, such as cable networks, the Internet, wireless networks, cellular networks and other private and/or public networks. Interconnected switches 1704a-1704d and router 1706, if present, may be referred to as a switch fabric, a fabric, a network fabric, or simply a network. In the context of a computer network, terms "fabric" and "network" may be used interchangeably herein.

Nodes 1702a-1702h may be any combination of host systems, processor nodes, storage subsystems, and I/O chassis that represent user devices, service provider computers or third party computers.

User devices may include computing devices to access an application 1732 (e.g., a web browser or mobile device application). In some aspects, the application 1732 may be hosted, managed, and/or provided by a computing resources service or service provider. The application 1732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1708. Additionally, the user device(s) may be part of the distributed system managed by, controlled by, or otherwise part of the service provider computer(s) (e.g., a console device integrated with the service provider computers).

The node(s) of FIG. 17 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1702a-1702h may include at least one memory 1718 and one or more processing units (or processor(s) 1720). The processor(s) 1720 may be implemented in hardware, computer-executable instructions, firmware, or combinations thereof. Computer-executable instruction or firmware implementations of the processor(s) 1720 may include computer-executable or machine-executable instructions written in any suitable programming language to perform the various functions described.

In some instances, the hardware processor(s) 1720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1718 may store program instructions that are loadable and executable on the processor(s) 1720, as well as data generated during the execution of these programs. Depending on the configuration and type of the node(s) 1702a-1702h, the memory 1718 may be volatile (such as RAM) and/or non-volatile (such as ROM, flash memory, etc.). The memory 1718 may include an operating system 1728, one or more data stores 1730, one or more application programs 1732, one or more drivers 1734, and/or services for implementing the features disclosed herein.

The operating system 1728 may support nodes 1702a-1702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1728 may also be a proprietary operating system.

The data stores 1730 may include permanent or transitory data used and/or operated on by the operating system 1728, application programs 1732, or drivers 1734. Examples of such data include web pages, video data, audio data, images, user data, and so on. The information in the data stores 1730 may, in some implementations, be provided over the network(s) 1708 to user devices 1704. In some cases, the data stores 1730 may additionally or alternatively include stored application programs and/or drivers. Alternatively or additionally, the data stores 1730 may store standard and/or proprietary software libraries, and/or standard and/or proprietary application user interface (API) libraries. Information stored in the data stores 1730 may be machine-readable object code, source code, interpreted code, or intermediate code.

The drivers 1734 include programs that may provide communication between components in a node. For example, some drivers 1734 may provide communication between the operating system 1728 and additional storage 1722, network device 1724, and/or I/O device 1726. Alternatively or additionally, some drivers 1734 may provide communication between application programs 1732 and the operating system 1728, and/or application programs 1732 and peripheral devices accessible to the service provider computer. In many cases, the drivers 1734 may include drivers that provide well-understood functionality (e.g., printer drivers, display drivers, hard disk drivers, Solid State Device drivers). In other cases, the drivers 1734 may provide proprietary or specialized functionality.

The service provider computer(s) or servers may also include additional storage 1722, which may include removable storage and/or non-removable storage. The additional storage 1722 may include magnetic storage, optical disks, solid state disks, flash memory, and/or tape storage. The additional storage 1722 may be housed in the same chassis as the node(s) 1702a-1702h or may be in an external enclosure. The memory 1718 and/or additional storage 1722 and their associated computer-readable media may provide non-volatile storage of computer-readable instructions, data structures, program modules, and other data for the computing devices. In some implementations, the memory 1718 may include multiple different types of memory, such as SRAM, DRAM, or ROM.

The memory 1718 and the additional storage 1722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. In some embodiments, the computer readable storage media may include instructions to implement functionality of some of the components of the network device 400. The memory 1718 and the additional storage 1722 are examples of computer storage media. Additional types of computer storage media that may be present in the node(s) 1702a-1702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1702a-1702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1702a-1702h may also include I/O device(s) 1726, such as a keyboard, a mouse, a pen, a voice input device, a touch input device, a display, speakers, a printer, and the like. The node(s) 1702a-1702h may also include one or more communication channels 1736. A communication channel 1736 may provide a medium over which the various components of the node(s) 1702a-1702h can communicate. The communication channel or channels 1736 may take the form of a bus, a ring, a switching fabric, or a network.

The node(s) 1702a-1702h may also contain network device(s) 1726 that allow the node(s) 1702a-1702h to communicate with a stored database, another computing device or server, user terminals and/or other devices on the network(s) 1700. The network device(s) 1724 of FIG. 17 may include similar components discussed with reference to the network device 1600 of FIG. 16.

In some implementations, the network device 1726 is a peripheral device, such as a PCI-based device. In these implementations, the network device 1726 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1608 may implement NVMe, and the network device 1726 may be connected to a computing system using a PCIe interface.

A PCI-based device may include one or more functions. A "function" describes operations that may be provided by the network device 1726. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1726 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 16, FIG. 17, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device, comprising:
   an input interface configured to receive a multiprotocol label switching (MPLS) packet associated with a label switching path (LSP), the MPLS packet comprising an MPLS header, wherein the network device is an egress label edge device for the label switching path;
   a scheduler priority calculator configured to determine a scheduler priority class using a quality of service (QoS) attribute from the MPLS packet, a scheduler priority map and a deployment model configuration, wherein the scheduler priority map is selected from a plurality of configurable scheduler priority maps based on the MPLS header, wherein the scheduler priority map is configured based on the deployment model configuration for the LSP, and wherein the QoS attribute has been selected from a plurality of QoS attributes based on the deployment model configuration for the LSP, and wherein the network device is configured to support any of a uniform deployment model, a pipe deployment model and a short-pipe deployment model for the LSP based on the deployment model configuration;
   a packet rewriter configured to update the QoS attribute for the MPLS packet based on the deployment model configuration; and
   an output interface configured to forward the MPLS packet with the updated QoS attribute based on the determined scheduler priority class for the MPLS packet.

2. The network device of claim 1, further comprising an MPLS QoS configuration table comprising QoS configuration parameters, wherein the packet rewriter updates the QoS attribute for the MPLS packet using the QoS configuration parameters.

3. The network device of claim 1, further comprising port specific QoS configuration registers, wherein the packet rewriter updates the QoS attribute for the MPLS packet using the port specific QoS configuration registers.

4. A network device, comprising:
   an input interface comprising circuitry to receive:
     a first packet comprising a first header, wherein the first packet is associated with a first label switching path, and wherein the network device is configured as an ingress label edge device for the first label switching path; and
     a second packet comprising a second header, wherein the second packet is associated with a second label switching path, and wherein the network device is configured as an egress label edge device for the second label switching path;
   a scheduler priority calculator comprising processing logic to:
     determine a first scheduler priority class for the first packet using a quality of service (QoS) attribute from the first packet and a first scheduler priority map, wherein the first scheduler priority map is selected from a plurality of configurable scheduler priority maps based on the first header, wherein the first scheduler priority map is configured based on a first deployment model configuration for the first label switching path; and
     determine a second scheduler priority class for the second packet using a QoS attribute from the second packet, a second scheduler priority map and a second deployment model configuration for the second label switching path, wherein the second scheduler priority map is selected from the plurality of configurable scheduler priority maps based on the second header, and wherein the second deployment model configuration has been used in selecting the QoS attribute from the second packet from a plurality of QoS attributes; and a scheduler to:
determine that a first scheduler priority for the first packet is higher than a second scheduler priority for the second packet;
assign higher network device resources for processing the first packet than the second packet based determining that first scheduler priority for the first packet is higher than the second scheduler priority for the second packet; and
schedule a cross-bar to forward the first packet prior to forwarding the second packet from an output interface.

5. The network device of claim 4, wherein the input interface further comprises circuitry to:
receive a third packet associated with a third label switching path, wherein the network device is configured as a label switching device for the third label switching path, wherein the scheduler priority calculator further comprises processing logic to:
determine a third scheduler priority class for the third packet using a QoS attribute from the third packet and a third scheduler priority map.

6. The network device of claim 4, wherein the first packet is an Internet Protocol (IP) packet and the first header is an IP header comprising a differential services code point (DSCP), and wherein the QoS attribute from the first packet includes the DSCP.

7. The network device of claim 6, further comprising:
a packet rewriter configured to update the QoS attribute for the IP packet based on the first deployment model configuration prior to forwarding the IP packet.

8. The network device of claim 7, wherein the first deployment model configuration indicates a uniform deployment model and wherein the updated QoS attribute for the IP packet includes a multiprotocol label switching (MPLS) traffic class, wherein the MPLS traffic class is determined from the DSCP using a MPLS traffic class map.

9. The network device of claim 8, wherein the IP header further comprises an IP address, and wherein the MPLS traffic class map is selected from a plurality of configurable MPLS traffic class maps using the IP address.

10. The network device of claim 6, wherein the IP header further comprises an IP address, and wherein the IP address is used to select the first scheduler priority map from the plurality of configurable scheduler priority maps.

11. The network device of claim 7, wherein the first deployment model configuration indicates a pipe deployment model or a short-pipe deployment model and wherein the updated QoS attribute for the IP packet includes an MPLS traffic class, wherein the MPLS traffic class includes a pre-configured MPLS traffic class value that is independent of the DSCP.

12. The network device of claim 4, wherein the second packet is an MPLS packet and the second header is an MPLS header, wherein the MPLS header includes an MPLS traffic class and a bottom-of-stack (BOS) indicator.

13. The network device of claim 12, wherein the MPLS header is an MPLS inner header, the MPLS traffic class is an MPLS inner traffic class and the BOS indicator indicates "1", and wherein the MPLS packet further comprises an MPLS outer header comprising an MPLS outer label, an MPLS outer traffic class and another BOS indicator indicating "0", and wherein the plurality of QoS attributes include the MPLS inner traffic class and the MPLS outer traffic class.

14. The network device of claim 13, wherein the second deployment model configuration indicates a uniform deployment model or a pipe deployment model, and wherein the MPLS outer traffic class is selected to be the QoS attribute for determining the second scheduler priority class.

15. The network device of claim 13, wherein the second deployment model configuration indicates a short-pipe deployment model, and wherein the MPLS inner traffic class is selected to be the QoS attribute for determining the second scheduler priority class.

16. The network device of claim 12, wherein the BOS indicator indicates "1" and wherein the MPLS packet further comprises an encapsulated IP packet comprising a DSCP, wherein the plurality of QoS attributes include the DSCP, and wherein the second deployment model configuration indicates a short-pipe deployment model, and wherein the DSCP is selected to be the QoS attribute for determining the second scheduler priority class.

17. The network device of claim 12, wherein the MPLS header further includes an MPLS label and wherein the MPLS label is used to select the second scheduler priority map from the plurality of configurable scheduler priority maps.

18. The network device of claim 12, further comprising:
a packet rewriter configured to update one of the plurality of QoS attributes for the second packet, based on the second deployment model configuration, prior to forwarding the second packet.

19. The network device of claim 18, wherein the MPLS packet further comprises an IP header comprising a DSCP and an explicit congestion notification (ECN), and wherein the plurality of QoS attributes include the DSCP, ECN and the MPLS traffic class.

20. The network device of claim 19, wherein the second deployment model configuration indicates a uniform deployment model or a pipe deployment model, and wherein the packet rewriter updates the ECN based on the MPLS traffic class and a congestion notification.

21. The network device of claim 20, further comprising:
a packet rewriter configured to update the QoS attribute for a third packet prior to forwarding the third packet, wherein the third packet is an MPLS packet comprising an MPLS header, wherein the MPLS header includes an MPLS outer traffic class, and wherein the QoS attribute for the third packet includes the MPLS outer traffic class.

22. The network device of claim 5, wherein the QoS attribute is associated with a first behavior aggregate and wherein the network device further comprises a per-hop behavior scheduling class (PSC) domain changer configured to change the QoS attribute from the first behavior aggregate to a second behavior aggregate for each of the packets.

23. A method comprising:
receiving, by a network device, a multiprotocol label switching (MPLS) packet associated with a label switching path (LSP), the MPLS packet comprising an MPLS header, wherein the network device is configured as an egress label edge device for the label switching path;

determining a scheduler priority class for the MPLS packet using a quality of service (QoS) attribute from the MPLS packet, a deployment model configuration and a scheduler priority map, wherein the scheduler priority map is selected from a plurality of configurable scheduler priority maps based on the MPLS header, wherein the scheduler priority map is configured based on the deployment model configuration for the LSP, and wherein the QoS attribute has been selected from a plurality of QoS attributes based on the deployment model configuration for the LSP, and wherein the network device is configured to support any of a uniform deployment model, a pipe deployment model and a short-pipe deployment model for the LSP based on the deployment model configuration;

updating the QoS attribute for the MPLS packet based on the deployment model configuration; and forwarding the MPLS packet with the updated QoS attribute based on the determined scheduler priority class for the MPLS packet.

24. The method of claim 23, wherein prior to forwarding the MPLS packet, the method further comprising:

determining priority and resources for forwarding the MPLS packet based on the determined scheduler priority class.

* * * * *